(12) United States Patent
Muraishi

(10) Patent No.: US 7,546,057 B2
(45) Date of Patent: Jun. 9, 2009

(54) CAPACITOR POWER SUPPLY UNIT, HEATING DEVICE, IMAGE FORMING APPARATUS, AND COPYING DEVICE

(75) Inventor: Norio Muraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 437 days.

(21) Appl. No.: 11/383,893

(22) Filed: May 17, 2006

(65) Prior Publication Data

US 2006/0269312 A1    Nov. 30, 2006

(30) Foreign Application Priority Data

May 27, 2005    (JP)    ............... 2005-155230

(51) Int. Cl.
*G03G 15/00* (2006.01)
*G03G 15/20* (2006.01)
(52) U.S. Cl. ........................... 399/88; 399/320
(58) Field of Classification Search ............ 399/90, 399/88, 320; 219/216
See application file for complete search history.

(56) References Cited

U.S. PATENT DOCUMENTS

2002/0012544 A1 * 1/2002 Yamane et al. .......... 399/88
2008/0181640 A1 * 7/2008 Hasegawa ............... 399/88

FOREIGN PATENT DOCUMENTS

| JP | 6-261452 | 9/1994 |
|----|----------|--------|
| JP | 08008089 A * | 1/1996 |
| JP | 2002-142369 | 5/2002 |
| JP | 2002-184554 | 6/2002 |
| JP | 2004-336919 | 11/2004 |
| JP | 2005-86900 | 3/2005 |

* cited by examiner

*Primary Examiner*—Susan S Lee
(74) *Attorney, Agent, or Firm*—Oblon, Spivak, McClelland, Maier & Neustadt, P.C.

(57) ABSTRACT

A capacitor power supply unit includes detectors for detecting an output voltage of a capacitor group, which includes a plurality of capacitors, and a charge controller that sets a long-time time limit if the output voltage is lower than a set value, and sets a short-time time limit if it is higher than the set value, starts counting the time when the reaching signal is generated, and stops charging performed by the chargers after the time limit elapses.

20 Claims, 13 Drawing Sheets

CAPACITOR POWER SUPPLY UNIT, HEATING DEVICE, IMAGE FORMING APPARATUS, AND COPYING DEVICE

CROSS-REFERENCE TO RELATED APPLICATIONS

The present document incorporates by reference the entire contents of Japanese priority document, 2005-155230 filed in Japan on May 27, 2005.

BACKGROUND OF THE INVENTION

1. Field of the Invention

The present invention relates to a capacitor power supply unit with a plurality of capacitors serially connected to each other, and more particularly to charge control of capacitor power supply. The capacitor power supply unit can be used for a heating device, a copier, a digital multifunction peripheral, a printer, a facsimile device, and the like.

2. Description of the Related Art

Copier, printers, or the like form images on a recording medium such as a plain paper and a medium for an overhead projector (OHP). An electrophotographic method is employed for the image formation in terms of high-speed image formation, image quality, and cost. The electrophotographic method is a method of forming a toner image on a recording medium, and fixing the toner image on the recording medium with heat and pressure. As a fixing method, a heat roll method is most broadly adopted at present in terms of safety. The heat roll method is a method of bringing a heating roller into contact with a pressing roller with pressure to form a mutual contact portion called a nip portion, and heating the recording medium with the toner image thereon at this nip portion. More specifically, the heating roller is heated by a heating element such as a halogen heater, and the pressing roller is arranged so as to face the heating roller. Recently, environmental problems become significant, which results in progressing of energy saving also in image forming apparatuses such as copiers and printers. A point which is not negligible to think about the energy saving of the image forming apparatus is power saving of a fixing device for fixing toner on the recording medium. An image forming apparatus for implementing energy saving is proposed in, for example, Japanese Patent Application Laid-Open (JP-A) No. 2002-184554. The energy saving in the image forming apparatus is implemented by using a high-capacitance capacitor such as an electric double layer capacitor as an auxiliary power supply for the fixing device to increase the maximum supply power.

A rated voltage of the electric double layer capacitor is dependent on a decomposition voltage of an electrolytic solution and is very low such as about 2.5 volts. Therefore, when the electric double layer capacitor is used as an electrical storage device, it is general to serially connect a plurality of the capacitors to increase the rated voltage and use the capacitors as a module. However, when a group (a module or a unit) of the capacitors serially connected to each other is to be charged or discharged, fluctuation in shared voltages occurs caused by fluctuation of capacitance and leakage current among the capacitors, and when each capacitor voltage exceeds the rated voltage, the excess causes degradation of the capacitance of the capacitor.

Therefore, when the module with the capacitors serially connected to each other is to be charged or discharged allowing for the fluctuation of capacitance and leakage current among the capacitors, the module has to be used by setting the capacitor voltage to a charging voltage lower than the rated voltage so that the capacitor voltage does not exceed the rated voltage. However, energy that can be stored in the electric double layer capacitor is based on a relation of $W=CV^2/2$. Therefore, if a terminal voltage is made lower than the rated voltage, decrease of charging energy is proportional to the square of the voltage. For example, if 2.0 volts is full charge with respect to the rated voltage of 2.5 volts, only 64% of chargeable energy can be charged.

To resolve this problem, JP-A Nos. H06-261452, 2004-336919, 2005-86900, 2002-142369 disclose parallel monitor circuits each of which detects each capacitor terminal voltage of the electric double layer capacitors serially connected, determines that the terminal voltage becomes a predetermined value, and restricts charging of the capacitor. A capacitor charging circuit is described in the cited document 4. The capacitor charging circuit is such that when the parallel monitor circuit bypasses the capacitor to restrict the charging, the parallel monitor circuit causes a photocoupler to emit light to generate a signal indicating completion of charging, and finishes the charging by the charging circuit when all the photocouplers generate a charging completion signal.

However, in these charging methods, if there is large fluctuation of capacitance among individual capacitors serially connected, it takes a comparatively long time from when an initial capacitor reaches the rated voltage and the parallel monitor is thereby activated until all the capacitors are charged to the rated voltage. Moreover, the power consumed in the parallel monitor is a large amount of heat generation expressed by terminal voltage×bypass current. Therefore, it is necessary to provide a circuit element or a radiating mechanism appropriate for such a large heat generation. Described in the cited document 5 is that, for equalizing charging voltages of capacitors, a unit with capacitors serially connected to each other is charged for a predetermined time, and after that, a voltage of a reverse polarity is applied to the unit for a fixed period to perform full discharge. However, it is necessary to provide a reverse-polarity charging circuit or a charging-polarity switching circuit for complete discharge of the whole capacitors in a short time, which causes hardware and charge/discharge control to become complicated. Furthermore, a large amount of power is consumed for charging or discharging for resetting used to completely discharge the whole capacitors.

SUMMARY OF THE INVENTION

It is an object of the present invention to at least partially solve the problems in the conventional technology.

According to an aspect of the present invention, a capacitor power supply unit includes a capacitor group in which a plurality of capacitors are serially connected to each other; a voltage detector that detects an output voltage of the capacitor group; a charger that charges the capacitor group; a plurality of monitor units that are connected in parallel to the capacitors in the capacitor group, respectively, bypass a charging current when a voltage of each of the capacitors reaches a predetermined voltage, and generate a reaching signal indicating reaching to the predetermined voltage; and a charge controller that sets a long-time time limit if the output voltage is lower than a first value, when the reaching signal is generated, and sets a short-time time limit if the output voltage is higher than the first value, starts counting time, and stops charging performed by the charger after the time limit elapses.

According to another aspect of the present invention, a capacitor power supply unit includes a capacitor group in which a plurality of capacitors are serially connected to each other; a voltage detector that detects an output voltage of the capacitor group; a charger that charges the capacitor group; a plurality of monitor units that are connected in parallel to the capacitors in the capacitor group, respectively, that bypass a charging current when a voltage of each of the capacitors reaches a predetermined voltage, and generate a reaching signal indicating reaching to the predetermined voltage; and a charge controller that sets a long-time time limit if the output voltage, when the charger starts charging, is lower than a second value, and sets a short-time time limit if the output voltage is higher than the second value, starts counting time when the reaching signal is generated, and stops the charging performed by the charger after the time limit elapses.

The capacitor power supply unit according to the above aspects can be employed in a heating device, an image forming apparatus, a copying device and the like.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
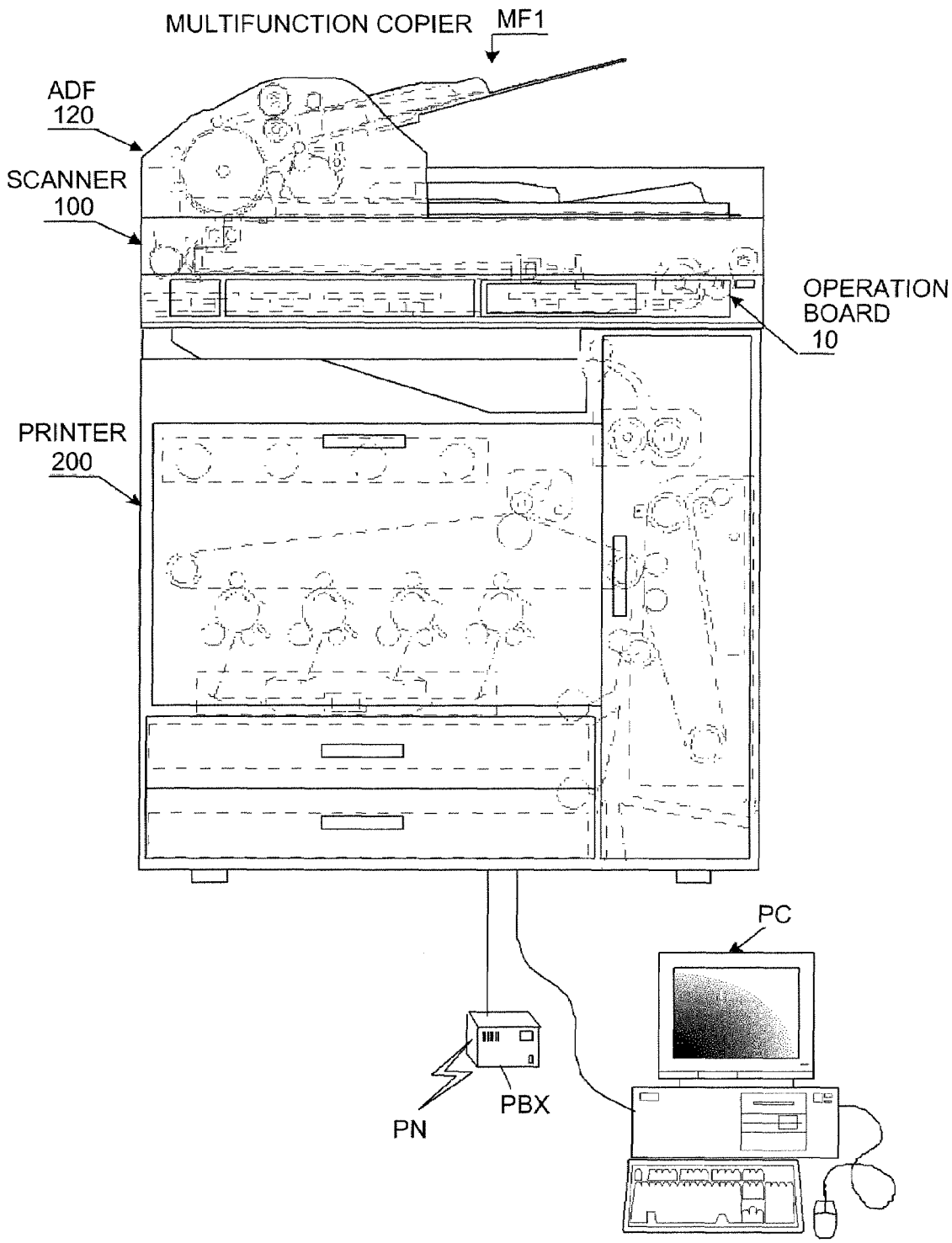
FIG. 1 is a vertical cross-section of a multifunction copier including a capacitor power supply unit according to a first embodiment of the present invention.

FIG. 1 depicts an appearance of a full-color digital multifunction copier MF1 according to a first embodiment of the present invention. The multifunction copier MF1 includes units such as an automatic document feeder (ADF) 120, an operation board 10, a color scanner 100, a color printer 200. The operation board 10 and the scanner 100 with the ADF 120 can be separated from the printer 200. The scanner 100 has a control board including a power device driver, a sensor input, and a controller, and performs direct or indirect communication with an engine controller (CPU 508 of FIG. 3) to be timing controlled, and reads a document image.

A controller board 501 (FIG. 3) is connected with the scanner 100, the printer 200, and an engine controller 510 (FIG. 3), and also connected with a Local Area Network (LAN) to which a personal computer (PC) is connected. A facsimile control unit 506 (FCU, FIG. 3) is connected with a private branch exchange (PBX) connected to a phone line PN (facsimile communication line).

Figure 2:
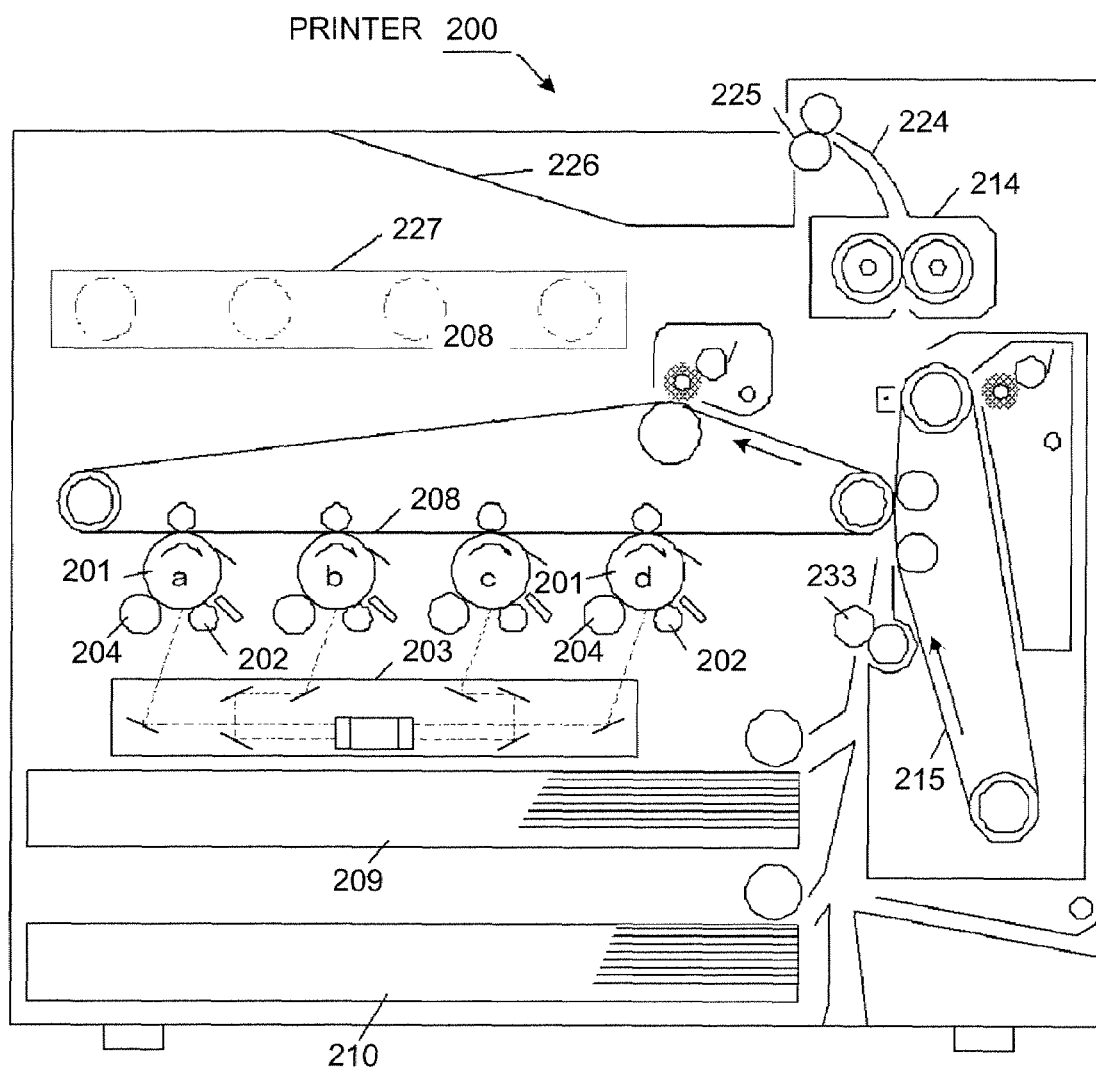
FIG. 2 is an enlarged vertical cross-section of a color printer shown in FIG. 1.

FIG. 2 depicts a mechanism of the printer 200 in the multifunction copier MF1. The printer 200 according to the first embodiment is a laser printer. The laser printer 200 has four sets of toner-image forming units "a" to "d" arranged in this order along a direction of movement (from left to right of FIG. 2) of a primary transfer belt 208, the toner-image forming units a to d being provided to form images of respective colors such as magenta (M), cyan (C), yellow (Y), and black (K). More specifically, the laser printer 200 is a full-color image forming apparatus of a four-drum type (tandem type).

Arranged around a photosensitive element 201, which is rotatably supported and is made to rotate in the direction of the arrow, are a decharger, a cleaning device, a charger 202, and a developing device 204. A space is ensured between the charging device 202 and the developing device 204 so that optical information emitted from an exposing device 203 enters through the space. There are four units (a, b, c, and d) of the photosensitive element 201, and components for image formation provided around each of the photosensitive elements 201 are the same as above, but colors of toner handled by the developing devices 204 are different from one another. Part of each of the photosensitive elements 201 is in contact with the primary transfer belt 208. However, a belt-type photosensitive element may be adopted.

The primary transfer belt 208 is supported and stretched by support rollers and a drive roller which rotate so as to be movable in the direction of the arrow, and a primary transfer roller is provided in the back thereof (inside of a belt loop) adjacent to each of the photosensitive elements 201. A cleaning device for the primary transfer belt is arranged outside the belt loop. A toner image is transferred from the primary transfer belt 208 to a transfer paper (paper) or a secondary transfer belt, and then unnecessary toner remaining on the surface of the primary transfer belt 208 is removed therefrom. The exposing device 203 uses a known laser system, and emits optical information corresponding to each formation of full color images, as a latent image, onto each surface of the photosensitive elements uniformly charged. Any other exposing device, which includes a light emitting diode (LED) array and an image forming unit, can also be adopted.

In FIG. 2, a secondary transfer belt 215 is provided on the right side of the primary transfer belt 208. The primary transfer belt 208 and the secondary transfer belt 215 contact each other to form a predetermined transfer nip. The secondary transfer belt 215 is supported and stretched by support rollers and a drive roller so as to be movable in the direction of the arrow, and a secondary transfer roller is provided in the back thereof (inside of a belt loop). A cleaning device for the secondary transfer belt and a charger or the like are arranged outside the belt loop. The cleaning device removes unnecessary toner remaining on the secondary transfer belt from which the toner is transferred to the transfer paper (paper). The transfer paper (paper) is stored in paper feed cassettes 209 and 210 provided in the lower side of the printer 200 of FIG. 2, and an uppermost sheet of paper is carried sheet by sheet by a paper feed roller to registration rollers 233 through a plurality of paper guides.

A fixing device 214, a paper discharge guide 224, a paper discharge roller 225, and a paper discharge stack 226 are arranged above the secondary transfer belt 215. A container 227 capable of containing toner for replenishment is provided above the primary transfer belt 208 and under the paper discharge stack 226. The color of toner includes four colors which are magenta, cyan, yellow, and black and are stored in respective cartridges. The developing device 204 is supplied with a corresponding color by a powder pump or the like.

The operation of each component for duplex printing is explained below. At first, an image is formed on the photosensitive element 201. More specifically, by operation of the exposing device 203, light emitted from an laser diode (LD) light source (not shown) reaches the photosensitive element of the image forming unit a of the photosensitive elements 201 which are uniformed charged by respective chargers 202, and forms a latent image corresponding to write information (information according to color). The latent image on the photosensitive element 201 is developed by the developing device 204, and a visible image with toner is formed and held on the surface of the photosensitive element 201. The toner image is transferred by the primary transfer roller to the surface of the primary transfer belt 208 which moves in synchronization with the photosensitive element 201. The surface of the photosensitive element 201 where the toner remains is cleaned by the cleaning device and decharged by the decharger to be ready for the next imaging cycle.

The primary transfer belt 208 carries the toner image transferred to its surface and moves in the direction of the arrow. A latent image corresponding to another color is written to the photosensitive element 201 of the image forming unit b, and developed with toner of the corresponding color to become a visible image. The image is superimposed on a previous visible image of a different color having being carried on the primary transfer belt 208, and finally four colors are superimposed on each other. It is noted that an image is also formed only with black as a single color. At the superimposition, the secondary transfer belt 215 moves in the direction of the arrow in synchronization with the primary transfer belt 208, and the image formed on the surface of the primary transfer belt 208 is transferred to the surface of the secondary transfer belt 215 by the action of the secondary transfer roller. The primary transfer belt 208 and the secondary transfer belt 215 are moving while images are respectively formed on the photosensitive elements 201 in the tandem-type four image forming units a to d, and image formation is carried out in the above manner, which allows time for the image formation to be reduced.

When the primary transfer belt 208 moves up to a predetermined point, a toner image to be formed on the other surface of the paper is again formed on the photosensitive element 201 at the same steps as above, and paper feeding is started. The uppermost sheet of paper in the paper feed cassette 209 or 210 is pulled out and is carried to the registration rollers 233. The toner image on the surface of the primary transfer belt 208 is transferred, by the secondary transfer roller, to one side of the paper which is fed through the registration rollers 233 to between the primary transfer belt 208 and the secondary transfer belt 215. The paper is further carried upwardly, where the toner image on the surface of the secondary transfer belt 215 is transferred to the other side of the paper by a charger. Upon transfer, the paper is conveyed at a timing so that the position of the image is appropriate.

The paper with the toner images transferred to both sides thereof at the steps is sent to the fixing device 214, where the toner images (both sides) on the paper are fused and fixed thereon at a time, and the paper is sent through the paper discharge guide 224 and discharged by the paper discharge roller 225 to the paper discharge stack 226 provided on the top surface of the main body. If a paper discharge portion is formed with the components 224 to 226 as shown in FIG. 2, the side (page) of images on both sides to be transferred to the paper afterward, namely the side directly transferred to the paper from the primary transfer belt 208 is placed with its face down on the paper discharge stack 226. Therefore, to align pages, an image for a second page is formed first and a toner image thereof is held on the secondary transfer belt 215, and an image for a first page is directly transferred to the paper from the primary transfer belt 208.

Exposure is performed in such a manner that the image directly transferred to the paper from the primary transfer belt 208 is formed as a normal image on the surface of the photosensitive element and the toner image to be transferred to the paper from the secondary transfer belt 215 is formed as an inverted image (mirror image) on the surface of the photosensitive element. The sequence of image formation for such page alignment and an image processing for switching between the normal image and the inverted image (mirror image) are also performed by read/write control of image data from/to a memory on the controller board 501. After the image is transferred from the secondary transfer belt 215 to the paper, the cleaning device removes unnecessary toner and paper dust remaining on the secondary transfer belt 215. The cleaning device includes a brush roller, a collecting roller, and a blade.

FIG. 2 indicates a state where the brush roller of the cleaning device for the secondary transfer belt 215 separates from the surface of the secondary transfer belt 215. The brush roller is configured to be pivotable about its supporting point and to enable contact/separation with respect to the surface of the secondary transfer belt 215. When the toner image is carried on the secondary transfer belt 215 and before transferred to the paper, the brush roller is separated, and when cleaning is needed, the brush roller pivots in the counterclockwise in FIG. 2 to be brought into contact with it. The unnecessary toner removed is collected to a toner container. These are the image forming process in a duplex printing mode when "Duplex transfer mode" is set. When duplex printing is selected, printing is always performed in this image forming process.

Single sided printing has two modes such as "Single transfer mode by the secondary transfer belt 215" and "Single transfer mode by the primary transfer belt 208". When the former single transfer mode using the secondary transfer belt 215 is set, a visible image with three colors or four colors superimposed on each other or with black as a single color is formed on the primary transfer belt 208. The visible image is then transferred from the primary transfer belt 208 to the secondary transfer belt 215, and is further transferred to one side of the paper. No image is transferred to the other side of the paper.

In this case, a printed side is the top side of a sheet of paper printed which is discharged to the paper discharge stack 226. When the latter single transfer mode using the primary transfer belt 208 is set, a visible image with three colors or four colors superimposed on each other or with black as a single color formed on the primary transfer belt 208 is not transferred to the secondary transfer belt 215, but is transferred to one side of the paper. No image is transferred to the other side of the paper. In this case, a printed side is the underside of a sheet of paper printed which is discharged to the paper discharge stack 226.

Figure 3:
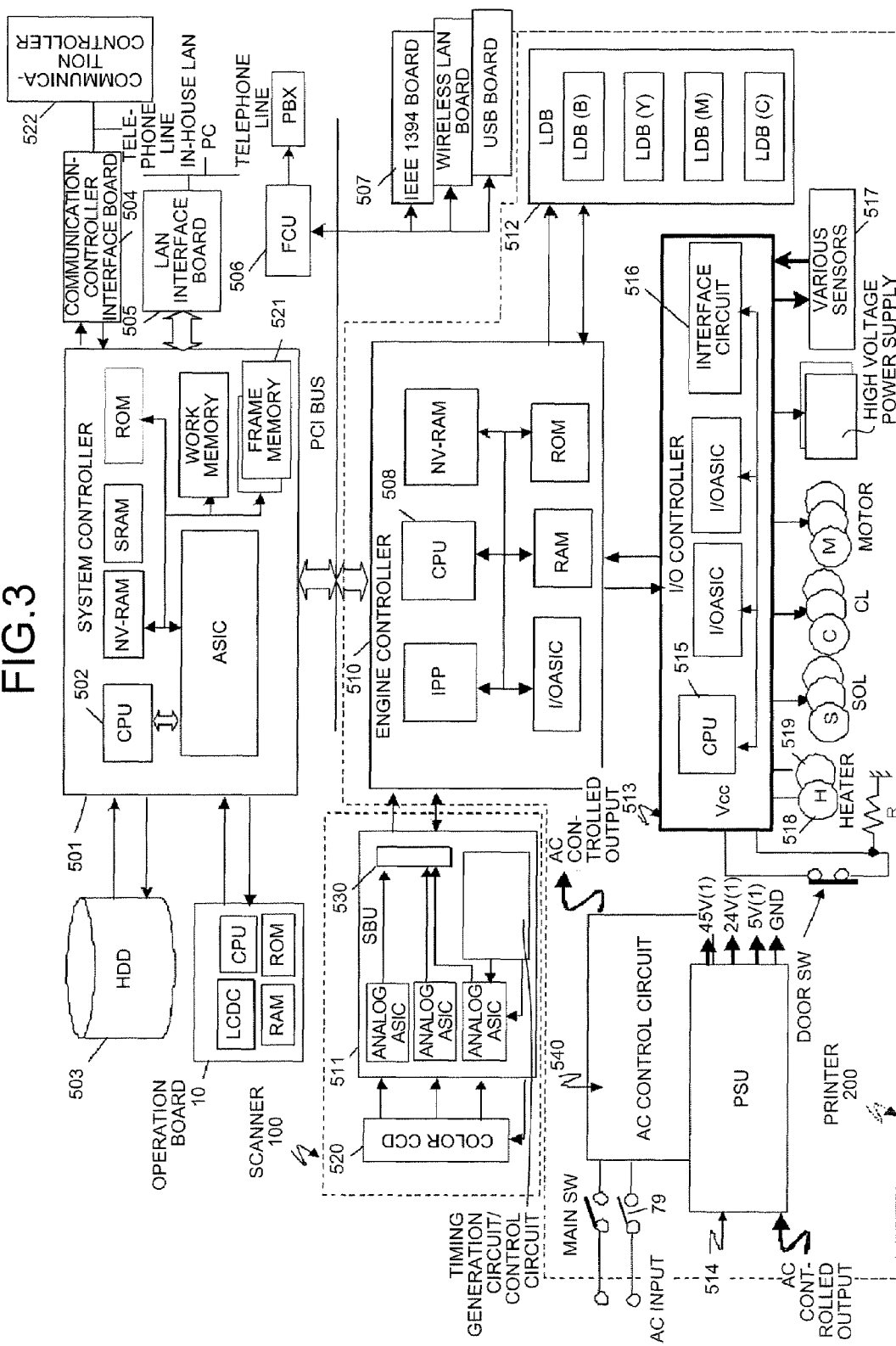
FIG. 3 is a block diagram of a schematic electric system of the multifunction copier shown in FIG. 1.

FIG. 3 depicts a system configuration of an electric system of the multifunction copier MF1 shown in FIG. 1. The electric system includes the controller board 501 as a system controller that controls the overall image forming apparatus; the operation board 10 which is connected to the controller board 501 and used for the image forming apparatus; a Hard Disk Drive (HDD) 503 that stores image data; a communication-controller interface board 504 that performs communications with an external device using an analog line; a Local Area Network (LAN) interface board 505; the facsimile control unit (FCU) 506 connected to a universal PCI bus; a portion 507 including an IEEE 1394 board, a wireless LAN board, and a universal serial bus (USB) board 507; the engine controller 510 connected to the controller board 501 through the PCI bus; an input-output (I/O) control board 513 as an I/O controller which is connected to the engine controller 510 and controls I/O of the image forming apparatus; a scanner board or sensor board unit (SBU) 511 that loads copy document (image); and a laser diode board (LDB) 512 that emits (optically writes) an image light expressed by image data to a photosensitive drum.

The scanner 100 that optically reads a document performs scanning of a document illumination light source over the document, and forms a document image on a charge-coupled device (CCD) 520. The document image i.e. a reflected light of illumination light to the document is photoelectrically converted in the CCD 520 to generate red (R), green (G), and blue (B) image signals.

When any failure occurs in the apparatus, the communication-controller interface board 504 instantly reports this effect to an external remote diagnosis device, which allows a service person to recognize how the failure has occurred and to fix it as quickly as possible. The communication-controller interface board 504 is also used for transmission of how the apparatus is used and the like.

The CCD 520 shown in FIG. 3 is a three-line color CCD, which generates R, G, and B image signals of EVENch (channel for even pixels)/ODDch (channel for odd pixels) and inputs the signals to an analog application specific integrated circuit (analog ASIC) of the SBU. The SBU 511 includes analog ASICs and a timing generation circuit/control circuit for driving the CCD and the analog ASICs. An output of the CCD 520 is held as samples by each sample hold circuit in the analog ASICs, and the samples held are A-D converted to be converted to R, G, and B image data, and are subjected to shading correction, to be sent by an output interface (I/F) 530 to an image processing processor (IPP) through an image data bus.

The IPP is a programmable arithmetic processor that performs image processing. More specifically, the IPP performs separation (determination on whether an image is in a text area or a photograph area: image area separation), background removal, scanner gamma conversion, filtering, color correction, change in magnification, image processing, printer gamma conversion, and gradation processing. Signals of the image data transmitted from the SBU to the IPP are degraded caused by an optical system and quantization to digital signals (signal degradation in scanner system). The IPP corrects the signal degradation, and writes the image data corrected to a frame memory 521.

The system controller 501 includes a Central Processing Unit (CPU) 502; Read Only Memory (ROM) for controlling the controller board; Random Access Memory (RAM) as work memory used by the CPU 502; nonvolatile (NV)-RAM including a lithium battery, backup of static RAM (SRAM), and a built-in clock; ASIC for performing system bus control of a system controller board as the system controller 510, frame memory control, and controlling the periphery of the CPU such as first-in first-out (FIFO); and an interface circuit for the ASIC.

The system controller 501 has functions of a plurality of applications such as a scanner application, a facsimile application, a printer application, and a copier application, and controls the overall system. The system controller 501 interprets an input to the operation board 10 to perform setting of the system and display the status of the system on a display unit of the operation board 10.

A large number of units are connected to the PCI bus, and image data and control commands are transferred in a time division manner through an image data bus/control command bus. The communication-controller interface board 504 is a communication interface board between a communication controller 522 and the system controller 501. Communication with the system controller 501 is performed based on full-duplex asynchronous serial communication. Communication with the communication controller 522 is performed by RS-485 multi-drop connection. The communication with a remote management system is performed through the communication-controller interface board 504. The LAN interface board 505 is connected to an in-house LAN, serves as a communication interface board between the in-house LAN and the system controller 501, and includes a PHY chip. The LAN interface board 505 and the system controller 501 are connected to each other through a standard communication interface such as a PHY chip I/F and an I2C bus I/F. Communication with an external device is performed through the LAN interface board 505.

The HDD 503 is used as an application database that stores an application program for the system and device bias information for the printer and an imaging process unit, and also as an image database that stores image data for a scanned image and an image to be written and document data. The HDD 503 is connected to the system controller 501 through a physical interface, an electrical interface, and an ATA/ATAPI-4based interface.

The operation board 10 includes CPU, ROM, RAM, and an ASIC (LCDC) for controlling a liquid crystal display (LCD) and an key entry. A control program for the operation board 10 is written in the ROM. The control program controls read of an entry to the operation board 10 and display/output. The RAM is work memory used by the CPU. The operation board 10 controls an entry by a user who operates a panel to enter system setting, and a display for displaying the content of the system set and the status of the system to the user.

Write signals for the colors such as black (B), cyan (C), magenta (m), and yellow (Y) output from the work memory of the system controller 501 are input to laser diode (LD)

writing circuits for B, C, M, Y in the LDB 512, respectively. LD current control (modulation control) is performed in each of the LD writing circuits and is output to each LD.

The engine controller 510 mainly controls an image forming process, and includes the CPU 508, IPP for image processing, ROM storing a program necessary for controlling copy and print out, RAM required for the control, and NV-RAM. The NV-RAM includes SRAM and memory for detecting power-off and storing a detection result in electrically erasable programmable ROM (EEPROM). An I/O ASIC includes a serial interface for performing transmission/reception of signals to/from CPU that controls other operations. The I/O ASIC is an ASIC that controls I/O (counter, fan, solenoid, motor, etc.) provided near a location where an engine control board as the engine controller 510 is implemented. The I/O control board 513 and the engine control board 510 are connected through a synchronous serial interface.

The I/O control board 513 installs a sub CPU 515, which converts each output voltage Vco of a fixing temperature sensor and of a capacitor power supply unit and analog signals of a P sensor and a T sensor, to digital signals and loads them, and performs I/O control on the image forming apparatus, including driving of an output device, detection of jam by referring to a paper sensor, and paper carrying control. An interface circuit 516 is an interface circuit with various sensors 517 and actuators (motor, clutch (CL), solenoid (SOL)).

Figure 4:
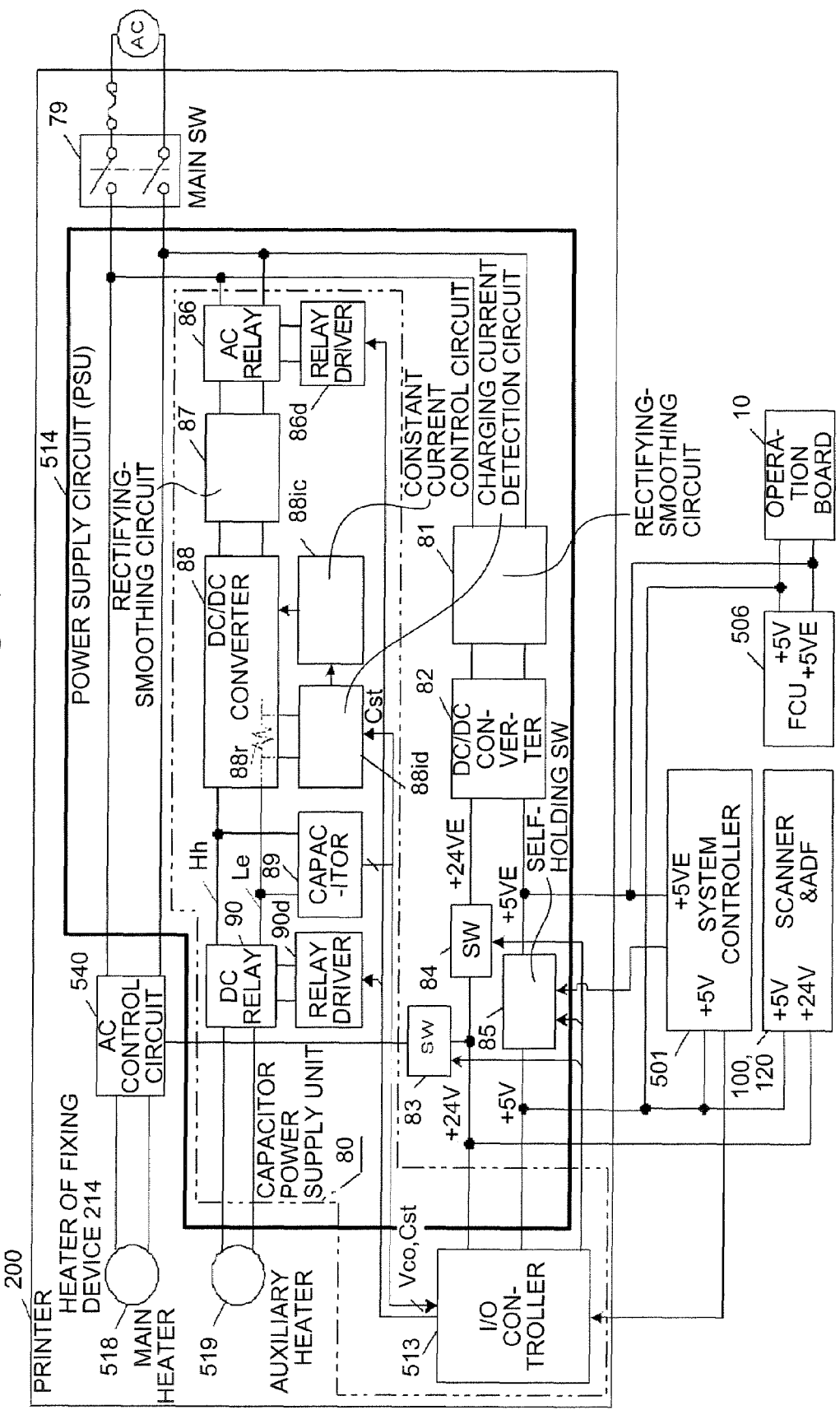
FIG. 4 is a block diagram of a power supply circuit for supplying power to components of the multifunction copier shown in FIG. 1.

A power supply unit (PSU) 514 supplies power for controlling the image forming apparatus. Commercial power is supplied by being switched on (closed) of a main switch (SW) 79 (FIG. 4). Commercial alternating current (AC) is supplied from a commercial power supply to an AC control circuit 540, and the AC control circuit 540 supplies direct current (DC) power to a main heater 518 (FIG. 4) of the fixing device 214. The power supply unit (or power supply circuit) 514 has a main power supply circuit that supplies a DC voltage to each component of the copier, and a capacitor power supply unit 80 (FIG. 4) that supplies a DC voltage to an auxiliary heater (FIG. 4) of the fixing device 214.

The power supply circuit 514 is schematically shown in FIG. 4. When the main SW (main power switch) 79 is closed, a commercial AC of 100 volts is provided to a rectifying-smoothing circuit 81 of the power supply circuit 514 and to the AC control circuit 540. A DC output of the rectifying-smoothing circuit 81 is applied to a DC/DC converter 82. In this example, the DC/DC converter 82 generates two series of DC voltages +24 VE and +5 VE of stabilized +24 volts and +5 volts, respectively.

In the power supply circuit 514, a switch 84 is connected to an output of the converter 82 on +24 VE (+24 volts) side, and a switch 85 is connected to an output thereof on +5 VE (+5 volts) side. The AC control circuit 540, which energizes the main heater 518 of the fixing device 214, has a power supply relay that is closed by +24 volts provided through a switch 83. The power supply relay is closed, and the commercial AC is thereby applied to an AC energization circuit, of the AC control circuit 540, which energizes the main heater 518. The AC energization circuit is used for phase control using a triac (phase control switching device), and controls conduction phase of the triac so as to cause a fixing temperature to be a target temperature, by referring to a temperature detection signal of the fixing temperature sensor read by the I/O controller 513.

The switch 85 is a self-holding switch, which turns on (conduction) in response to an on instruction signal from the CPU 502 of the controller board 501 and self-holds the on state, and turns off (non-conduction) in response to an off instruction signal (reset instruction signal) from the CPU 508 of the engine controller 510 and releases the self holding. The voltage of +5 volts output from the self-holding switch 85 is supplied to control circuits of the respective components in the copier. The voltage of +5 VE applied to the switch 85 is applied to a circuit and the CPU 502. More specifically, the circuit monitors whether a return condition to an operation mode (standby mode) in an energy-saving mode (suspend mode) is satisfied.

Because an output voltage +5 volts of the switch 85 is applied to the CPU 508 of the engine controller 510 and the I/O controller 513, when the CPU 502 of the controller board 501 turns on the switch 85 to return from the energy-saving mode (suspend mode) to the operation mode (standby mode), the engine controller 510 (CPU 508 thereof) and the I/O controller 513 start their operations respectively by being energized by the output voltage +5 volts of the switch 85.

A control signal for turning on/off the switches 83 and 84 is provided to the switches 83 and 84 from the CPU 508 of the engine controller 510 through the I/O controller 513. But the CPU 502 of the controller board 501 issues an on/off switching instruction to the CPU 508 of the engine controller 510 when the switching between the energy-saving mode and the operation mode is necessary. All the switches 83, 84, and 85 are on in "standby mode" (normal mode) in which the fixing temperature of the fixing device 214 is kept to the target temperature determined for performing a fixing process for a transfer paper with a toner image thereon or to a slightly lower temperature than the target temperature and in which image formation can be started in response to a command of "copy start" or "print" without substantial delay time.

In "low power mode" (energy-saving mode), the CPU 502 of the controller board 501 switches the switch 83 to the off state, the switch 83 providing an on instruction voltage +24 volts to the power supply relay of the AC control circuit 540 which energizes the main heater 518, through the CPU 508 of the engine controller 510. In other words, the CPU 502 shuts off the power to the AC control circuit 540. In the "low power mode", both the switch 84 for supplying +24 volts to a power system and the switch 85 for supplying +5 volts to a control system and a communication system continue the on state, to enable the scanner 100 and the ADF 120 to perform the operations, without print-out, for image reading to be accumulated or to be registered in the HDD 503, image reading to be transmitted by facsimile, and image reading of a document to be sent to a personal computer (PC).

In the "suspend mode", the CPU 502 of the controller board 501 turns off both the switch 84 and the switch 85 through the CPU 508 of the engine controller 510. In other words, all the switches 83 to 85 are turned-off.

In the "suspend mode", however, the switches 83 to 85 are off, but +5 VE is applied to detection signal lines for a pressure plate switch of the scanner 100, a document sensor of the ADF 120, and for a power key switch of the operation board 10. Furthermore, +5 VE is continuously applied to an electric circuit that detects a print command of the personal computer (PC), and also to a facsimile reception detection circuit of the facsimile control unit (FCU).

Table 1 described below gives a relationship between each energy saving switching mode and on/off of the switches 83 to 85, and table 2 gives information processing items executable in the modes. In table 2, "transmission/reception" indicates facsimile transmission or reception of the FCU without print-out, and "data holding" indicates holding of accumulated image data in the memory.

TABLE 1

| | | SETTING OF SWITCH | | |
| --- | --- | --- | --- | --- |
| | | SW83 | SW84 | SW85 |
| MODE | STANDBY | ON | ON | ON |
| | LOW POWER | OFF | ON | ON |
| | SUSPENSION | OFF | OFF | OFF |

TABLE 2

| | | EXECUTABLE FUNCTION | | | | | |
| --- | --- | --- | --- | --- | --- | --- | --- |
| | | DETECTION OF ENTRY | IMAGE READING | COPY | PRINT | TRANSMISSION/ RECEPTION | DATA HODLING |
| MODE | STANDBY | yes | yes | yes | yes | yes | yes |
| | LOW POWER | yes | yes | no | no | yes | yes |
| | SUSPENSION | yes | no | no | no | yes | yes |

The power supply circuit 514 has the capacitor power supply unit 80 that supplies power to the auxiliary heater 519 of the fixing device 214. The main unit of the capacitor power supply unit 80 is a capacitor unit 89. The configuration of the capacitor unit 89 is explained later with reference to FIG. 5. The capacitor unit 89 is connected to a DC output terminal of the DC/DC converter 88 as a charging unit and to a DC input terminal of a DC relay 90 as a discharging unit (power supply unit). The DC/DC converter 88 is applied with a DC voltage, which is obtained in such a manner that a rectifying-smoothing circuit 87 rectifies a commercial AC voltage supplied through an AC relay 86. It is noted that the DC relay 90 is connected with a relay driver 90d and the AC relay 86 is connected with a relay driver 86d. A constant current control circuit 88ic provides switching pulses (pulse-width modulation (PWM) pulses) to a chopper circuit (switching circuit) that energizes a primary side of a voltage regulating transformer of the DC/DC converter 88. The constant current control circuit 88ic is a switching regulator that PWM-controls (controls a feedback constant current) the switching of the chopper circuit.

A charging current detection circuit 88id amplifies a voltage (current detection voltage) of a current detection resistor 88r, the voltage being proportional to an output current, and feeds back the voltage amplified to the constant current control circuit 88ic. More specifically, the current detection resistor 88r is inserted to an output current feedback route of the rectifying-smoothing circuit on the output side of the voltage regulating transformer. The constant current control circuit 88ic operates a pulse width of the PWM pulses so that the charging current signal fed-back matches the target level, and provides the pulses to the chopper circuit. In other words, the constant current control circuit 88ic provides constant current control.

The charging current detection circuit 88id includes an amplifier circuit and an analog gate circuit. The amplifier circuit generates a first feedback signal having a low amplification factor and a second feedback signal having a high amplification factor, and the analog gate circuit selects either one of the signals and outputs the signal selected to the constant current control circuit 88ic as a feedback signal.

The first feedback signal having the low amplification factor is output to the constant current control circuit 88ic during the time when a monitor signal Cst of the capacitor unit 89, explained later, is in high level H indicating that voltages of all the capacitors of a capacitor group are below the predetermined voltage Vs2, the capacitor group being such that a plurality of electric double layer capacitors are serially connected to each other. And the second feedback signal having the high amplification factor is output to the constant current control circuit 88ic when the monitor signal Cst changes to low level L indicating that a charging voltage of at least one of the capacitors reaches the predetermined voltage Vs2. Thus, the constant current control circuit 88ic supplies a high current, being a constant current, to the capacitor unit 89 during the time when the voltages of all the capacitors are below the predetermined voltage Vs2, and supplies a low current, being a constant current, to the capacitor unit 89 when the charging voltage of at least one capacitor has reached the predetermined voltage Vs2.

Figure 5:
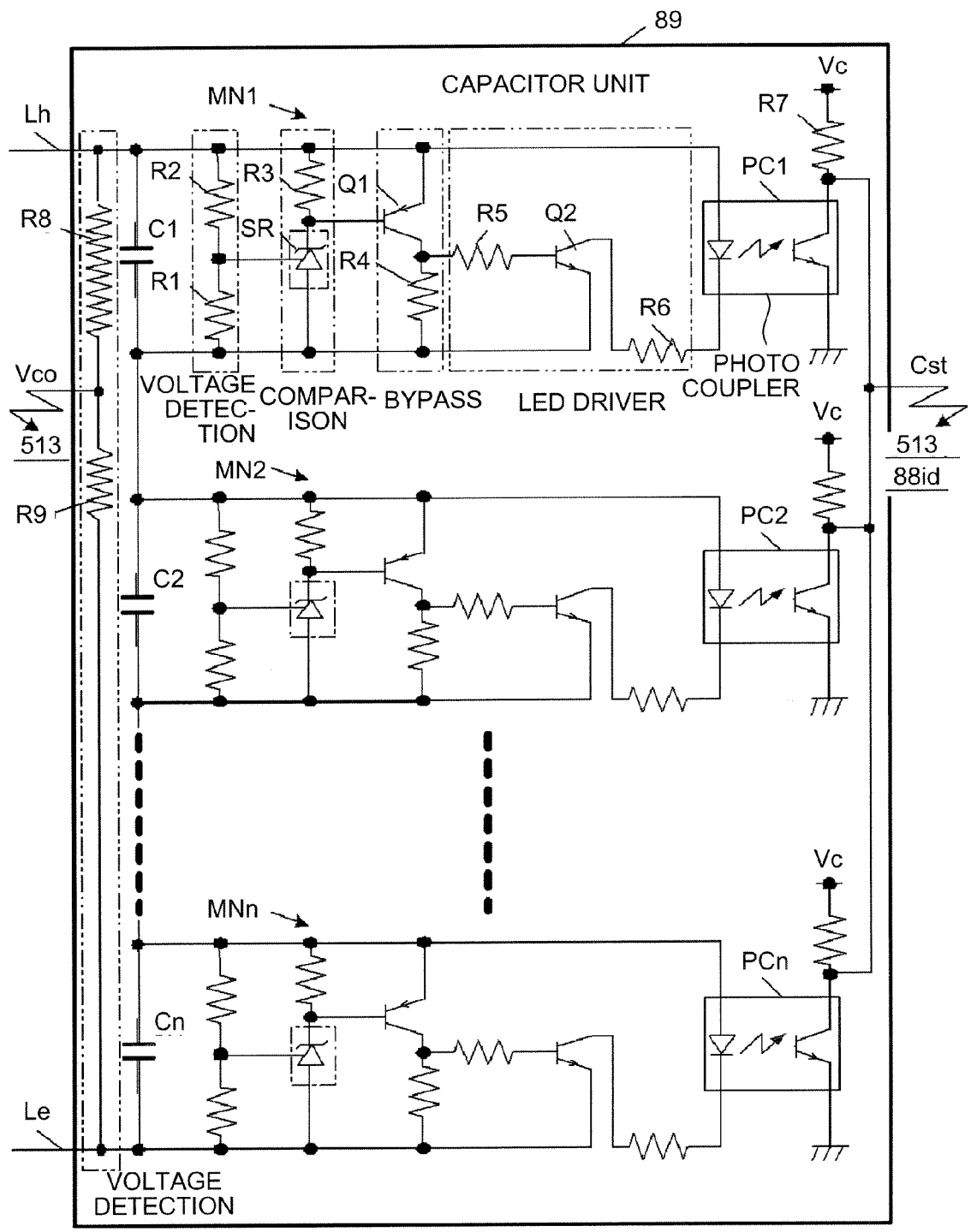
FIG. 5 is an electric circuit diagram of a capacitor unit shown in FIG. 4.

The configuration of the capacitor unit 89 is shown in FIG. 5. The capacitor unit 89 in this embodiment is such that 18 electric double layer capacitors C1 to Cn (n=18), each of which a rated charging voltage is 2.5 volts and capacitance is 600 F, are serially connected to each other, and are connected to between a charging line Lh and a discharging line Le. A voltage Vco between both ends of a serially-connected capacitor group between the charging line Lh and the discharging line Le, that is, a rated voltage between the charging line Lh and the discharging line Le is 2.5×18=45 volts. Monitor circuits MN1 to MNn, which have substantially the same configuration and properties as one another, are connected to the capacitors C1 to Cn, respectively.

The monitor circuit MN1 includes a resistance voltage dividing circuit R1 and R2 for detecting a charging voltage of the capacitor; comparison and bypass circuits SR, R3, Q1, and R4 for detecting whether the charging voltage has reached a reference value; an LED driver R5, Q2, and R6; a photocoupler PC1; and a current limiting resistor R7. It is noted that photocouplers PC2 to PCn, instead of the photocoupler PC1, are included in the monitor circuit MN2 to MNn, respectively. Output terminals of the monitor circuits MN1 to MNn are commonly connected (OR connected). The monitor signal Cst is in high level H during the time when outputs of all the monitor circuits MN1 to MNn are in high level H indicating that a capacitor voltage is less than the predetermined voltage Vs2, but the monitor signal Cst is inverted to low level L when a voltage of any capacitor Ci reaches the predetermined voltage Vs2 and the monitor signal of a monitor circuit MNi connected to the capacitor Ci is inverted to low level L.

Upon charging, a charging voltage of, for example, 45 volts is applied from the DC/DC converter 88 to between the charging line Lh and the discharging line Le, and the constant current control circuit 88ic performs constant current control on a charging current to, for example, about 10 amperes (A). During continuing constant current charging of the capacitors C1 to Cn, a charging voltage of any capacitor Ci of the capacitors C1 to Cn reaches the predetermined voltage Vs2, upon which a shunt regulator SR of the monitor circuit MNi connected to the capacitor Ci is turned on (conducted), and a PNP transistor Q1 is thereby turned on. Therefore, the charging current applied to the capacitor Ci is bypassed, and accordingly, the charging of the capacitor Ci is finished. Furthermore, the PNP transistor Q1 is turned on, a NPN transistor Q2 is thereby turned on, which causes a light emitting diode of a photocoupler PCi to be lit and a phototransistor to be turned on, this causes the monitor signal Cst to switch from H to L.

The predetermined voltage Vs2 is a voltage value at which the charging current is bypassed when the charging voltage reaches this value, and is set so as to be slightly lower than the rated voltage of the electric double layer capacitor. The predetermined voltage Vs2 is decided as the following equation with a reference voltage VR1 of the shunt regulator SR and resistances of voltage dividing resistors R2 and R1:

$$Vs2=VR1(1+R2/R1)$$

Figure 6:
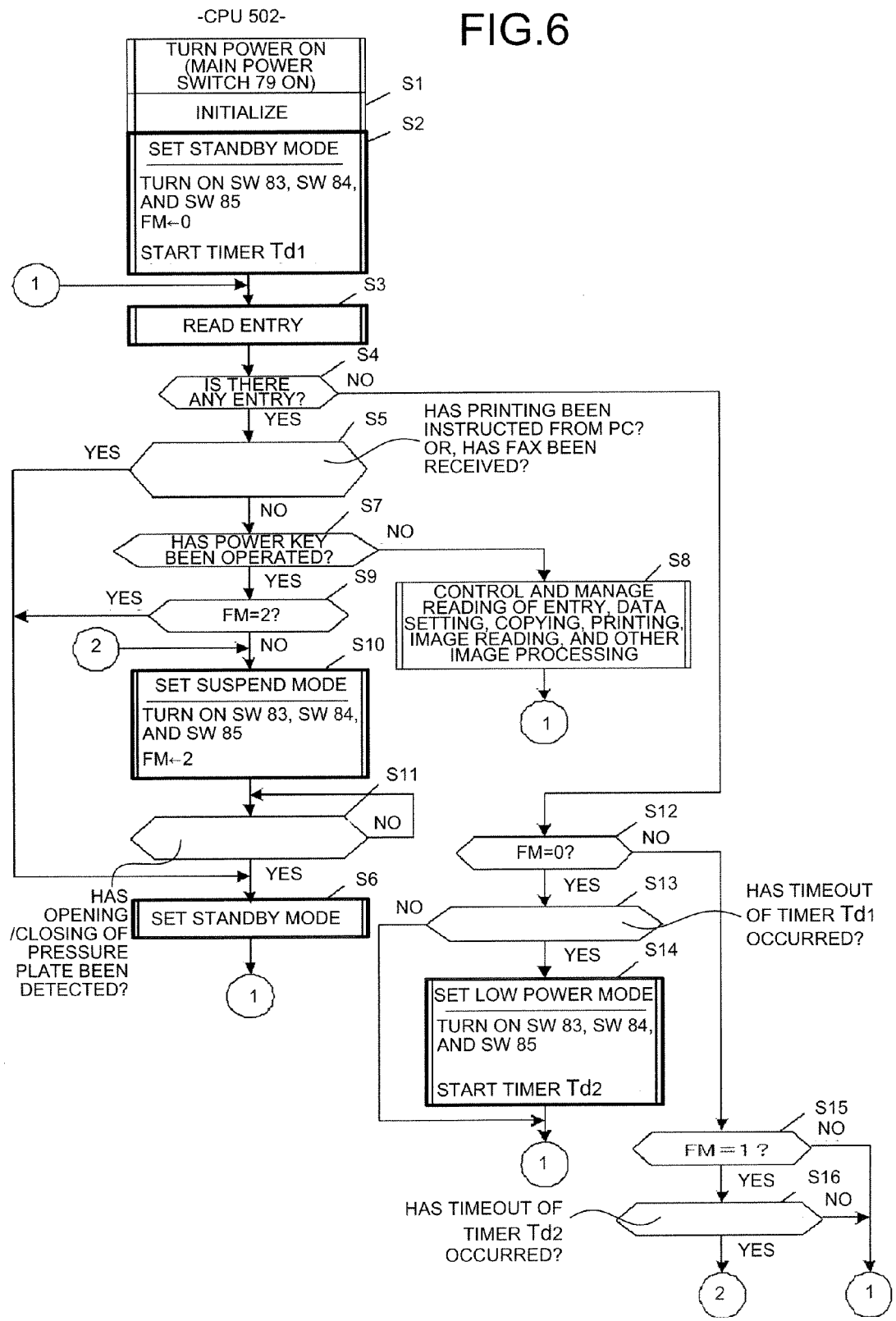
FIG. 6 is a flowchart of a part of a control flow mainly for energy saving control by a CPU of a controller board as a system controller shown in FIG. 3.

FIG. 6 is a flowchart of switching control among the standby mode, the low power mode, and the suspend mode executed by the controller board 501 (CPU 502 thereof). When the main SW 79 between the power supply circuit 514 (FIG. 4) and a commercial AC power supply AC (outlet) is closed and the power supply circuit 514 provides an operation voltage of +5 VE, the CPU 502 of the controller board 501 performs initialization process in response to power-on (step S1), and sets the standby mode (step S2). More specifically, when the switch 85 is on, the operation voltage of +5 volts is applied to the engine controller 510 and the I/O controller 513, and each of them finishes its initialization, the CPU 502 instructs the CPU 508 of the engine controller 510 to set the standby mode (which indicates on of the switches 83 and 84). In response to this, the CPU 508 turns on the switches 83 and 84 through the I/O controller 513. This causes an operation voltage and an AC voltage to be applied to the AC control circuit 540, and the AC control circuit 540 starts energizing the main heater 518, which starts to increase the fixing temperature toward the target temperature.

The CPU 502 sets data for an energy-saving mode register FM to "0" indicating the standby mode, and starts a timer Td1 in which switching latency Td1 from the standby mode to the low power mode is set as a time limit (step S2).

In the following, the term "step S" is omitted from each of parentheses and only a numeral of a step number is written therein.

The setting of the standby mode allows the operation voltage to be applied to each component of the multifunction copier MF1. The CPU of the operation board 10 executes initialization for power-on in response to the application of the operation voltage by the setting of the standby mode (2), and reads a copy condition of a normal processing mode from the NV-RAM of the operation board 10 to display it on a liquid crystal touch panel.

At a step of reading an entry (3), the CPU of the operation board 10 reads operation of the user performed through the operation board 10, and reports the operation to the CPU 502 of the controller board 501, and the CPU 502 interprets commands from the PC and the FCU 506. The CPU of the operation board 10 controls reading of normal operations for the copier and display/output, such as reading of an entry using an image processing mode key, switching of display on the liquid crystal panel, reading of pressing of a number key in response to an entry operation of the user to the operation board 10, generation of numeral data input, reading of pressing of a start key, transmission of start instruction to the controller board 501, and reading of an entry for switching paper sizes.

The switching latency Td1 from the standby mode to the low power mode and switching latency Td2 from the low power mode to the standby mode can be input through the operation board 10, and input values are stored (registered) in nonvolatile memory NV-RAM of the operation board 10.

In "reading of an entry" (3), when receiving a print instruction from the PC or receiving a report on facsimile reception from the FCU 506 (5), and if the power supply circuit 514 is in either the suspend mode or the low power mode, the CPU 502 switches the mode to the standby mode (6).

In "reading of an entry" (3), when receiving an entry of an instruction, for example, an operation of the user using the operation board 10 (touch of an image processing mode specifying key, pressing of a number key, pressing of the start key, switching of paper sizes, or the like), the CPU 502 of the controller board 501 proceeds to the process corresponding to the entry of the instruction (5, 7, 8).

In "reading of an entry" (3), when the power key on the operation board 10 is turned on while the standby mode is set, the CPU of the operation board 10 and the CPU 502 of the controller board 501 regard the operation as an instruction from the user to switch to the suspend mode (7, 9), and the CPU of the operation board 10 writes the image processing mode during display on the liquid crystal touch panel to the NV-RAM of the operation board 10 as a previous mode, and shifts to the suspend mode (10). When shifting to the suspend mode, the CPU 502 waits for generation of an operation detection signal for a pressure plate of the scanner 100 or of a detection signal for a document set on the ADF 120 (11). When either one of the detection signals is generated, the CPU 502 sets the power supply circuit 514 to the standby mode (6). When the print command is received from the PC during waiting for generation of the detection signal, the power supply circuit 514 is set to the standby mode (5, 6).

When the power key is turned on while the low power mode or the suspend mode is set, the CPU 502 regards the operation as an instruction from the user to switch to the standby mode, and sets the standby mode, reads the image processing mode previously written to the NV-RAM of the operation board 10, and displays it on the liquid crystal touch panel (7, 9, 6).

If there is no entry for an instruction in "reading of an entry" (3), the CPU 502 checks whether timeout of the timer Td1 occurs during waiting for an entry of an instruction (12, 13). When there is no entry of an instruction and the timeout thereof occurs, the CPU 502 shifts to the low power mode (14). Furthermore, the CPU 502 writes "1" indicating the low power mode to the mode register FM, and starts the timer Td2 with a time limit of Td2. Thereafter, when there is no entry and timeout of the timer Td2 occurs (15, 16), the CPU 502 shifts to the suspend mode (16, 10).

Figure 7:
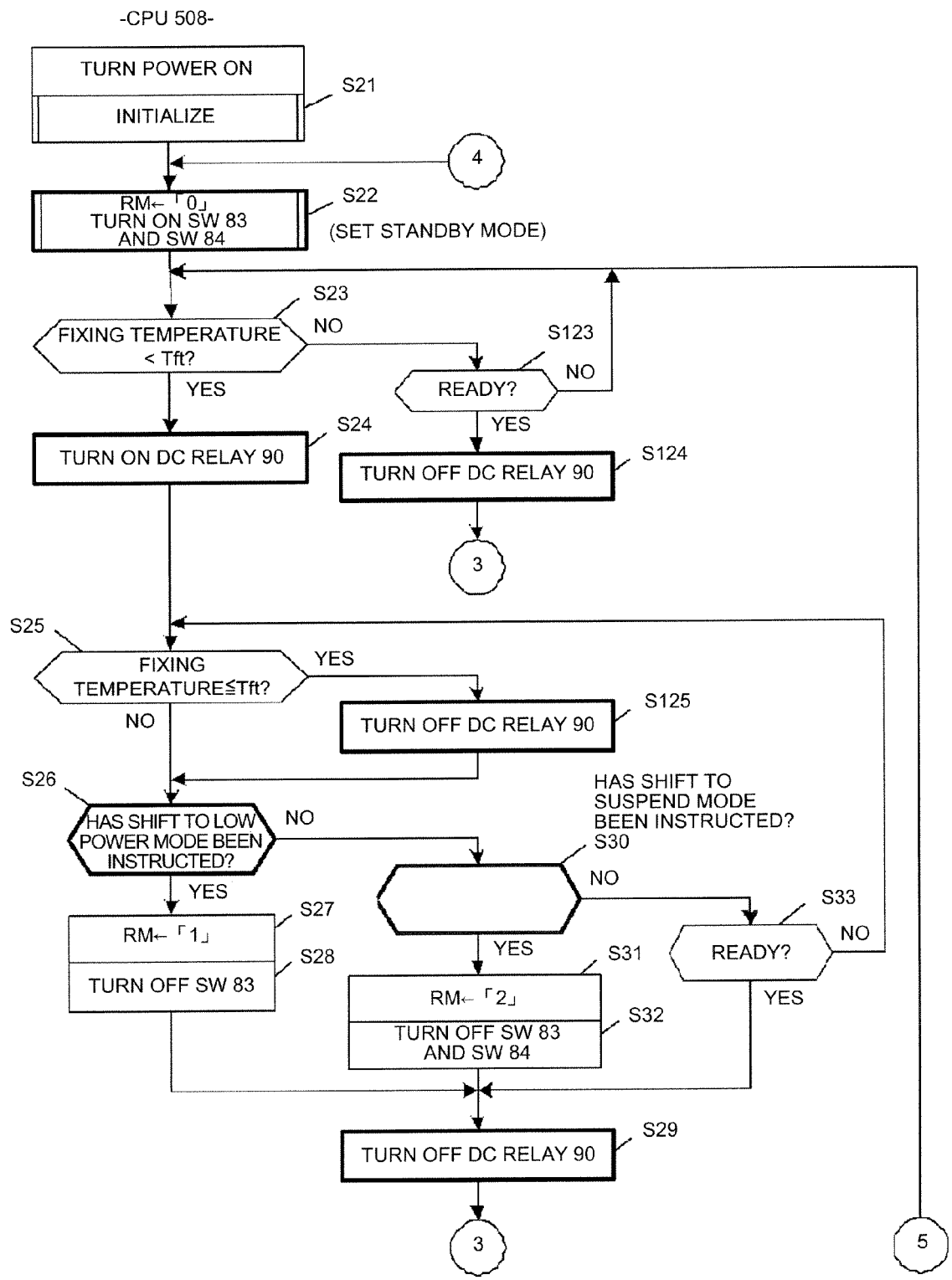
FIG. 7 is a flowchart of a schematic discharge control of the capacitor unit by a CPU of an engine controller shown in FIG. 3.
Figure 8:
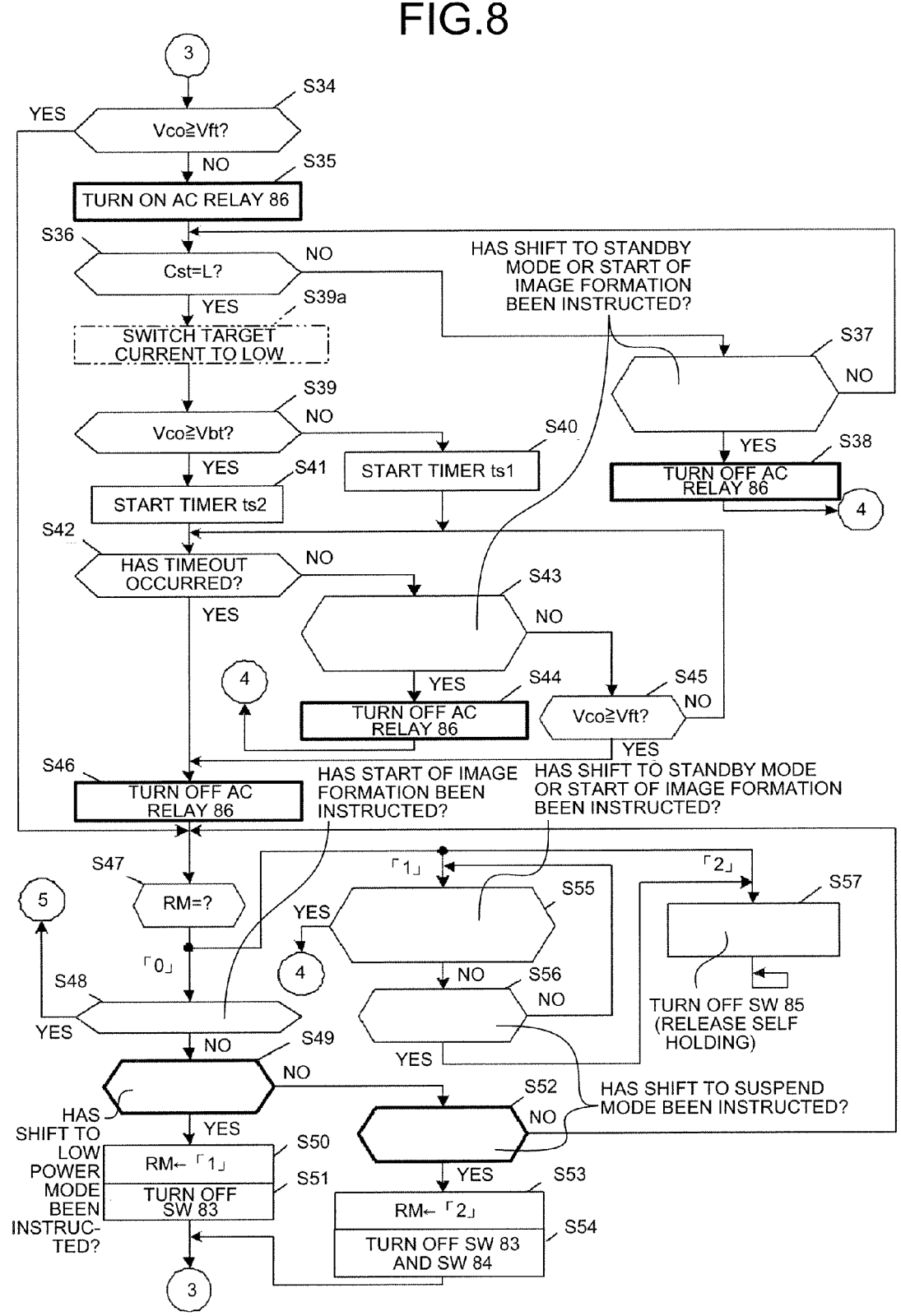
FIG. 8 is a flowchart of a schematic charge control of the capacitor unit by the CPU of the engine controller shown in FIG. 3.

FIG. 7 and FIG. 8 represent flowcharts of a schematic charge/discharge control of the capacitor unit 89 executed by the CPU 508 of the engine controller 510 which uses the I/O controller 513. At first, referring to FIG. 7, where the discharging process is shown, as already explained above, the CPU 502 turns on the switch 85, and a control operation voltage +5 volts is thereby applied to the engine controller 510, the I/O controller 513, and other control circuits. This occurs in the following cases. One of the cases is such that the main SW 79 is turned on, and the operation voltage +5 VE during the suspend mode is applied to the CPU 502, which causes the CPU 502 to operate, and the initialization (1 in FIG. 6) is finished and the standby mode is set (2). Another one of the cases is such that the condition of returning to the standby mode is satisfied after the standby mode is shifted to the low power mode or the suspend mode while the main SW 79 is in an on state and this allows returning to the standby mode.

When the operation voltage +5 volts is applied, the CPU 508 of the engine controller 510 executes the initialization (21) and sets each component of the engine controller 510 to a standby state, and turns on the switches 83 and 84 through the I/O controller 513 after waiting for completion of initialization in the I/O controller 513 in response to application of the operation voltage +5 volts also to the I/O controller 513 (22). This causes the copier MF1 to become the standby mode. Data in a mode register RM provided in an internal RAM of the CPU 508 is set to data indicating "0" in the decimal number that indicates the standby mode (22). The AC relay 86 and the DC relay 90 of the capacitor power supply unit 80 (FIG. 4) are set to be off (non-conduction=shut-off) according to the initialization of the I/O controller 513 in response to the application of the operation voltage +5 volts, and therefore, the off state is continued from before application of the control operation voltage +5 volts. More specifically, there is no charging of the capacitor unit 89, nor is there discharging (power supply) from the capacitor unit 89 to the auxiliary heater 519.

The CPU 508 refers to the fixing temperature read by the I/O controller 513 from the fixing temperature sensor. If it is below a threshold Tft, the CPU 508 turns on the DC relay 90 (conduction) through the I/O controller 513. This allows the capacitor unit 89 to supply power (discharge) to the auxiliary heater 519, and the auxiliary heater 519 is thereby heated up. When the fixing temperature becomes the threshold Tft or more, the CPU 508 turns off the DC relay 90 (non-conduction=shut-off) (25, 125). Consequently, discharging from the capacitor unit 89 to the auxiliary heater 519 is stopped.

If an instruction to switch to the low power mode is received from the CPU 502 during power supply from the capacitor unit 89 to the auxiliary heater 519 (14 in FIG. 6), to shut off power to the main heater 518, the CPU 508 turns off the switch 83 through the I/O controller 513, and writes data indicating "1" in the decimal number to the mode register RM (26 to 28). Then, the DC relay 90 is turned off (29). Because the on state of the switch 84 is continued, document image reading by the scanner 100 and the ADF 120 is possible.

If receiving an instruction to switch to the suspend mode (10 in FIG. 6) from the CPU 502, the CPU 508 turns off the switches 83 and 84 through the I/O controller 513, and writes data indicating "2" in the decimal number to the mode register RM (30 to 32). Then, the DC relay 90 is turned off (29). Shifting to the suspend mode is implemented by performing a charging process on the capacitor unit 89 at step 34 to step 46 of FIG. 8 explained later, and resetting (turning off) the self-holding switch 85 through the I/O controller 513 at step 57 after step 47. This allows the control operation voltage +5 volts to the engine controller 510 (CPU 508), the I/O controller 513, and other control circuits to disappear.

When the fixing temperature rises up to a temperature, which is below but near the threshold Tft, capable of starting printing, and when a machine internal status becomes a status where a start instruction can be accepted from the user, the CPU 502 generates a ready signal. When a series of image forming processes for copying or printing are finished and next user instruction can also be accepted, the CPU 502 also generates the ready signal. When the ready signal is generated, the CPU 508 also turns off the DC relay 90 (29). In other words, discharging of the capacitor unit 89 is stopped, and then the CPU 508 proceeds to the charging process of FIG. 8.

The main purpose of the auxiliary heater 519 is to speed up rise of the fixing temperature when there is high probability that the fixing temperature may be low immediately after the main SW 79 is turned-on and immediately after the low power mode or the suspend mode is returned to the standby mode. However, in the first embodiment, by reducing the normal power consumption of the main heater 518 and the AC control circuit 540 each of which is assumed small-sized because the rated power of the main heater 518 is comparatively low, it is avoided that the fixing temperature is not high enough for high-speed continuous printing, printing for a wide paper, and printing for a thick paper. To achieve this purpose, the threshold Tft is set to almost the same level as or a slightly higher value than the minimum fixing temperature at which a minimum fixing function is satisfied. When the fixing temperature becomes below the Tft not only upon switching to the standby mode but also upon the imaging operation after the switching, the CPU 508 turns on the DC relay 90 (conduction) through the I/O controller 513 (48, 5-in-a circle of FIG. 8, and 23, 24 of FIG. 7). Thus, the auxiliary heater 519 is heated.

If the fixing temperature is the Tft or higher, the CPU 508 does not turn on the DC relay 90 but waits for the ready signal (end of a series of image forming processes) generated by the CPU 502 (123), and turns on the DC relay 90 when the fixing temperature is reduced to below the Tft (24). When the ready signal is generated without reduction of the fixing temperature to below the Tft, the CPU 508 turns off the DC relay 90 (124), and proceeds to the charging process of FIG. 8.

Referring to FIG. 8, at the first step of the charging process, the CPU 508 refers to an output voltage Vco (FIG. 5) of the capacitor unit 89 read by the I/O controller 513. When the output voltage Vco is below a set value Vft specified to a rated voltage value (45 volts) of the capacitor unit 89, the CPU 508 turns on the AC relay 86 through the I/O controller 513 (35). The commercial AC voltage is thereby applied to the rectifying-smoothing circuit 87, and the rectifying-smoothing circuit 87 generates an AC voltage and is applied to a chopper circuit (switching circuit) which is provided in the DC/DC converter 88 and energizes a primary winding of a voltage regulating transformer.

The constant current control circuit 88ic operates at a DC voltage (divided voltage thereof) generated by the rectifying-smoothing circuit 87 to generate PWM pulses, and provides the PWM pulses to the chopper circuit. This causes the chopper circuit to repeatedly turn on/off with the cycle and duty of a PWM pulse to energize the primary winding of the voltage regulating transformer in a pulsed manner. This causes a voltage produced in a secondary winding of the voltage regulating transformer to be rectified and smoothed, and the voltage is output from the DC/DC converter 88 to the capacitor unit 89.

The charging current detection circuit 88id detects an output current (charging current) of the DC/DC converter 88 based on the voltage of the current detection resistor 88r, and provides the first feedback signal having a low amplification factor to the constant current control circuit 88ic. Therefore, the constant current control circuit 88ic performs constant current control on high current output, and the DC/DC converter 88 charges the capacitor unit 89 with the high current. The CPU 508 waits for either generation of a reaching signal (Cst=L) indicating that any one of the capacitors in the capacitor unit 89 is charged to Vs2 (the signal Cst becomes L), or reception of an instruction to shift to the standby mode or of an image-formation start instruction, from the CPU 502 (36, 37).

When the reaching signal (Cst=L) is generated, the CPU 508 refers to an output voltage (charging voltage) Vco of the capacitor unit 89 at this time (39). If the output voltage Vco is lower than a predetermined value Vbt which is set to a value of about 90% of a rated voltage (45 volts), the CPU 508 starts a timer ts1 with a time limit of a long-time value ts1 (40). And if it is the predetermined value Vbt or higher, the CPU 508 starts a timer ts2 with a time limit of a short-time value ts2, which is longer than time t20 (FIG. 13) (41). The CPU 508 waits for the timeout of the timer (42), and when the timeout occurs, the CPU 508 turns off the AC relay 86 (46). In other words, the CPU 508 stops the charging of the capacitor unit 89. When the instruction to shift to the standby mode or the image-formation start instruction is received from the CPU 502, the CPU 508 turns off the AC relay 86 upon its reception (38, 44), and returns to step 22 of FIG. 7 where the standby mode is set. More specifically, the CPU 508 ends the charging process for the capacitor unit 89 and proceeds to the discharging process. Furthermore, the CPU 508 monitors whether the charging voltage Vco of the capacitor unit 89 has reached the set value Vft during waiting for the timeout of the timer (45), and turns off the AC relay 86 when it has reached the set value Vft (46).

When the reaching signal (Cst=L) is generated, the charging current detection circuit 88id switches, in response to the generation, the feedback signal to the constant current control circuit 88ic from the first feedback signal having the low amplification factor to the second feedback signal having the high amplification factor (39a). During the remaining charge time when the timeout is waited, the constant current control circuit 88ic performs constant current control under which a low current is supplied to the capacitor unit 89, so that the output current (charging current) of the DC/DC converter 88 has been switched to a fixed low value. During the remaining charge time, in a capacitor cell of which voltage has reached the predetermined voltage Vs2, a current passes through a charging-current bypass line of the parallel monitor. Consequently, heat generation occurs caused by current loss at the PNP transistor Q1 and the resistor R4 on the bypass line. Therefore, the charging current is reduced in the above manner during the remaining charge time, to minimize the heat generation at the PNP transistor and the resistor.

When the AC relay 86 is turned off, that is, when charging of the capacitor unit 89 is stopped, the CPU 508 refers to data in the mode register RM (47). If the data is "2" (instruction to shift to the suspend mode), the CPU 508 resets the switch 85 (57), namely, the CPU 508 turns it off. This allows the control operation voltage +5 volts to the engine controller 510 (CPU 508), the I/O controller 513, and other control circuits to disappear, and the operation of the CPU 508 is stopped.

When recognizing the instruction to shift to the suspend mode sent from the CPU 502 at step 30 of FIG. 7, the CPU 508 stops charging of the capacitor unit 89 at that point in time (29), charges the capacitor unit 89 at steps 34 to 46 of FIG. 8, completes the charging, and turns off the self-holding switch 85 (57). That is, the CPU 508 shifts to the suspend mode. Because the copier MF1 is in a low power consumption state in which an electrical current to the main heater 518 is lowered or is shut off, the charging of the capacitor unit 89 does not lead to an excessive increase in power load as the whole of the copier MF1. When the mode is returned from the suspend mode to the standby mode (22 of FIG. 7), the capacitor unit 89 has been charged, which allows a large amount of power to be supplied to the auxiliary heater 519 and the fixing temperature to quickly rise.

When the data in the mode register RM is "1" (low power mode), the CPU 508 waits for either reception of an instruction to shift to the standby mode or the suspend mode, or reception of an image-formation start instruction (55, 56). In this case also, the charging of the capacitor unit 89 is completed. When receiving the instruction to shift to the suspend mode, the CPU 508 turns off the switch 85 to enter into the suspend mode (57). However, when receiving the instruction to shift to the standby mode or the image-formation start instruction, the CPU 508 proceeds to the process for setting of the standby mode of FIG. 7 (22). In this case also, the capacitor unit 89 has been charged, which allows a large amount of power to be supplied to the auxiliary heater 519 and the fixing temperature to quickly rise.

When the data in the mode register RM is "0" (standby mode), the CPU 508 waits for either reception of an instruction to shift to the low power mode or the suspend mode, or reception of an image-formation start instruction (48, 49, 52). When receiving the instruction to shift to the low power mode, the CPU 508 shifts to the low power mode (50, 51), performs the charging process (34 to 46), and is in a standby state in the low power mode (47, 55, 56). But when receiving the instruction to shift to the suspend mode, the CPU 508 performs the pre-processing for shifting to the suspend mode (53, 54), performs the charging process (34 to 46), and shifts to the suspend mode (47, 57).

When the CPU 508 proceeds to the energy-saving mode (suspend mode, low power mode) in the above manner, a full charge of the capacitor unit 89 is completed. Therefore, when the mode is returned to the standby mode, a large amount of power can be supplied to the auxiliary heater 519, which allows the fixing temperature to quickly rise. Moreover, the charging of the capacitor unit 89 for that purpose is performed when it is in standby state (ready) where the CPU 508 waits for an instruction from the user in the standby mode in which there is a small amount of power consumption as the overall copier MF1, or when it is in the low power mode and when the condition to shift to the suspend mode is satisfied. Therefore, the charging of the capacitor unit 89 does not lead to an excess of an instantaneous power load on the copier MF1. Consequently, avoidance of an increase in rated power for the copier MF1 or reduction in the rated power and high-speed heat-up of the fixing temperature are compatible with each other.

Figure 12:
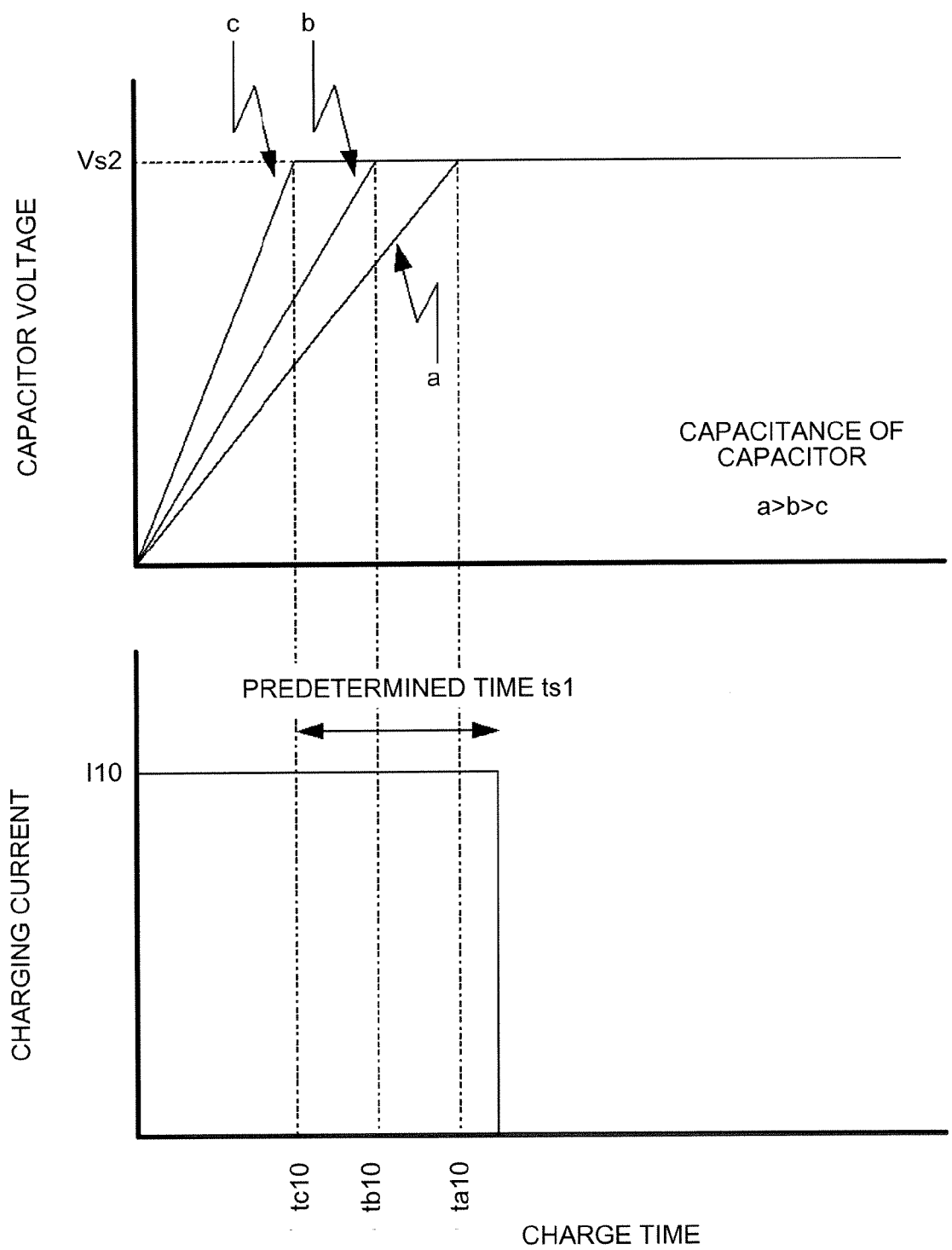
FIG. 12 is a schematic graph of fluctuation of time from starting to charge the capacitors in the capacitor unit at each low remaining voltage level to reaching the predetermined voltage Vs2, and of a remaining charge time ts1 to be set corresponding to the fluctuation.

The time limits ts1 and ts2 are explained below. FIG. 12 is a graph of changes in capacitor voltages a, b, and c and a charging current with respect to time, upon charging in a state in which a charge time up to a set voltage largely fluctuates between capacitors each as a single unit due to fluctuations of leakage current upon initial charging and after a long time is elapsed. Upon charging in this state, a remaining charge time, from when the voltage of any capacitor of a plurality of serially connected capacitors reaches the predetermined voltage Vs2 until the charging is finished, is a comparatively long time. The long-time time limit ts1 is set in the following manner that a condition, such that a charge time is the longest, is calculated and a value longer than a longest time ta10 is set, based on tolerance of capacitor capacitance and voltage dividing resistance. More specifically, the charge time indicates the time from when voltage of any one of the capacitors reaches the predetermined voltage Vs2 until voltages of all the capacitors reach the predetermined voltage Vs2.

The longest time ta10 is calculated by the following equations where I10 is the charging current, and allowing for the tolerance, Cmin is the minimum value of the capacitance of a capacitor and Cmax is the maximum value thereof, VR1min is the minimum value of the reference voltage of the shunt regulator SR and VR1max is the maximum value thereof, R100min and R100max are the minimum value and the maximum value of voltage dividing resistance R100 respectively, and R101min and R101max are the minimum value and the maximum value of voltage dividing resistance R101 respectively.

$$ta10 = (Cmax \times Vs2max - Cmin \times Vs2min)/I10$$

$$Vs2max = VR1max(1+R100max/R101min)$$

$$Vs2min = VR1min(1+R100min/R101max)$$

Therefore, for the long-time time limit ts1, it is necessary to set a value greater than ta10 in the above equation.

Figure 13:
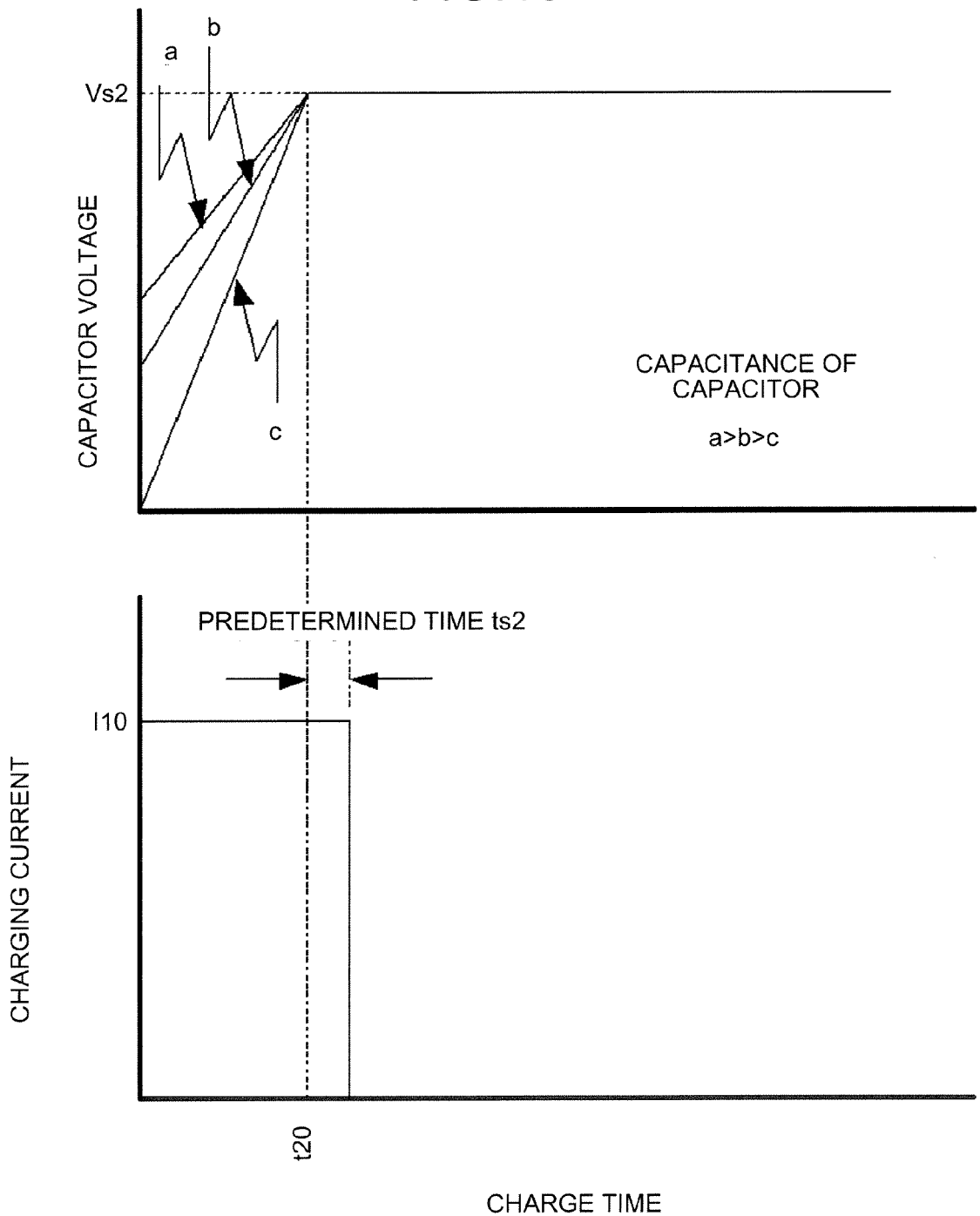
FIG. 13 is a schematic graph of fluctuation of time from starting to charge the capacitors in the capacitor unit at each high remaining voltage level to reaching the predetermined voltage Vs2, and of a remaining charge time ts2 to be set corresponding to the fluctuation.

FIG. 13 is a graph of changes in each capacitor voltage and a charging current with respect to time, in a state in which the reference of charging and discharging of the capacitors is the predetermined voltage Vs2 after capacitor voltages are set to the predetermined voltage Vs2 upon charging. When charging is performed in the state where the reference of charging and discharging of the capacitors is the predetermined voltage Vs2 after the capacitor voltages are set to the predetermined voltage Vs2 upon the charging, and if there is no leakage current fluctuation, as shown in FIG. 13, the voltages of all the capacitors concurrently reach the predetermined voltage Vs2. In an actual case, however, the leakage current fluctuation occurs, which causes the times for reaching the predetermined voltage Vs2 to vary. Therefore, a short-time time limit ts2 shorter than the long-time time limit ts1 is set, and capacitor voltages within the short-time time limit ts2 after the voltage of any one of the capacitors reaches the predetermined voltage Vs2 are equalized.

In the first embodiment, a preceding charge time is about 150 sec. The preceding charge time is the time from the state where remaining voltages of the whole capacitors of the capacitor unit 89 are set to zero until charging with a charging current of 10 A is started and a voltage of at least one of the capacitors, whose capacitance is 600±5%, reaches a rated voltage 2.5 volts. Assume that the threshold Vbt (39 of FIG. 8) is set to a value of about 90% of the rated output 45 volts and that the charging with the charging current 10 A is further continued even after at least one of the capacitors reaches the predetermined voltage Vs2. In this case, if the remaining charge time ts1 is set to about 10 to 15 sec, ts2 is about 5 to 10 sec, the charging voltage Vco of the capacitor unit 89 becomes the rated voltage of about 45 volts near the end of the remaining charge time. In the first embodiment, because the charging current is reduced during the remaining charge time, this causes the rise of the charging voltage to be reduced. Therefore, each of the remaining charge times ts1 and ts2 is set longer by the reduced amount of the charging current, such that the remaining charge time ts1 is about 30 to 40 sec, and ts2 is about 10 to 20 sec.

Most of the hardware and functions (including those by software) according to a second embodiment of the present invention are the same as these according to the first embodiment which are explained with reference to FIG. 1 to FIG. 8. In the second embodiment, however, the auxiliary heater 519 is supplied with power from the capacitor unit 89 irrespective of the fixing temperature when the standby mode is selected. This is performed for the purpose of speedily increasing the fixing temperature, when the fixing temperature may possibly be low, for example, immediately after the main SW 79 is turned on and immediately after the mode is returned from the low power mode or the suspend mode to the standby mode.

Figure 9:
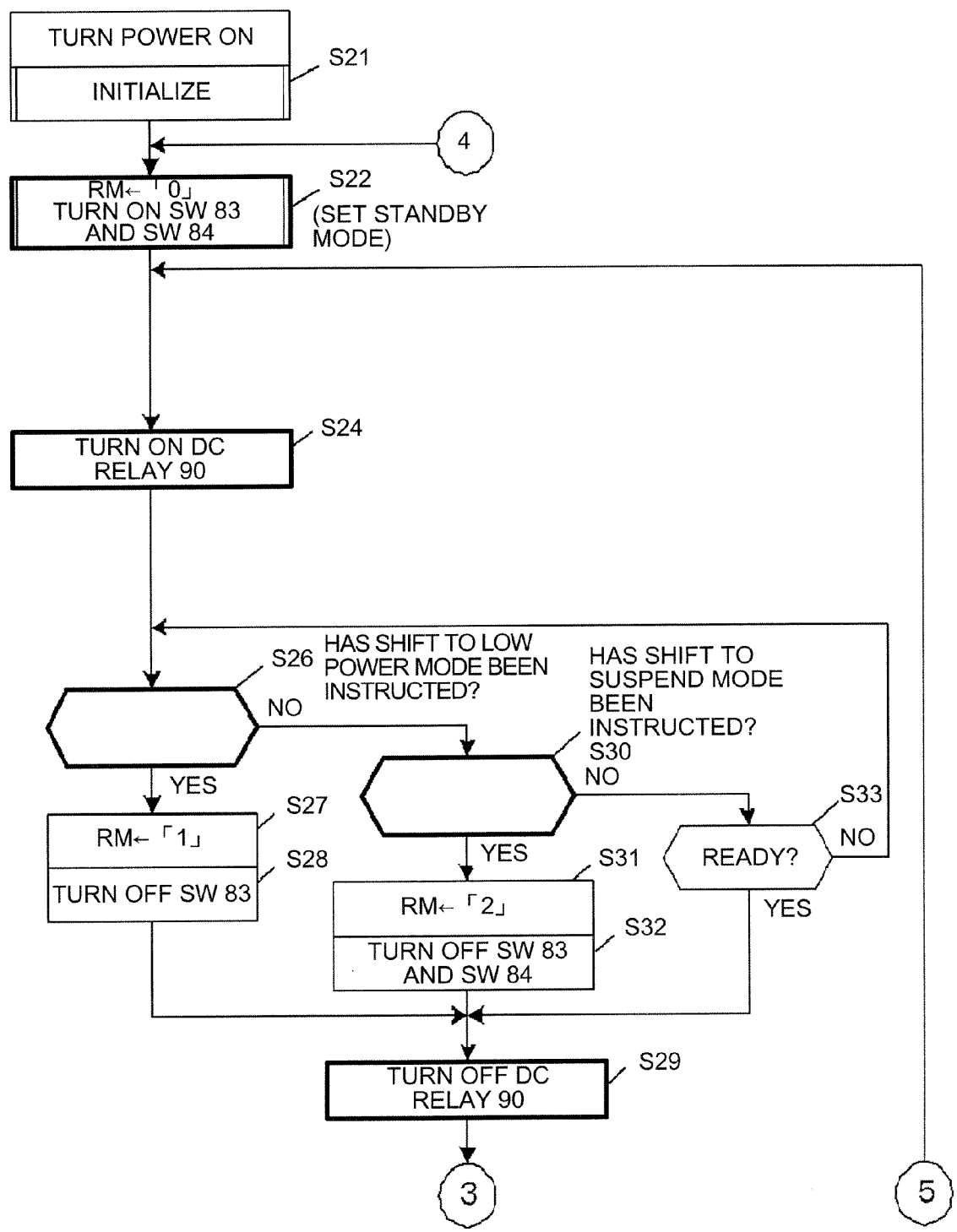
FIG. 9 is a flowchart of a schematic discharge control of the capacitor unit by the CPU of the engine controller according to a second embodiment of the present invention.

FIG. 9 shows how the discharging (power supply) process in the CPU 508 according to the second embodiment is performed, instead of the discharging (power supply) process shown in FIG. 7 of the first embodiment. When the main SW 79 is turned on and the standby mode is set (22), or when the shift from the low power mode or from the suspend mode to the standby mode is instructed and the standby mode is set (22), the CPU 508 turns on the DC relay 90 (24). In other words, power supply from the capacitor unit 89 to the auxiliary heater 519 is started. Thereafter, the CPU 508 waits for the instruction to shift to the low power mode, the instruction to shift to the suspend mode, or the ready signal given from the CPU 502 of the controller board 501 (26, 30, 33), and continues power supply to the auxiliary heater 519 through this period.

When the shift to the low power mode is instructed, the CPU 508 turns off the switch 83 through the I/O controller 513 to shut off electricity to the main heater 518, and writes the data indicating "1" in the decimal number to the mode register RM (26 to 28). And, the CPU 508 turns off the DC relay 90 (29). Because the on state of the switch 84 is continued, the image reading of a document by the scanner 100 and the ADF 120 is possible. When the switch to the suspend mode is instructed from the CPU 502, the CPU 508 turns off the switches 83 and 84 through the I/O controller 513, and writes the data indicating "2" in the decimal number to the mode register RM (30-32). And the CPU 508 turns off the DC relay 90 (29). When the ready signal is generated, the CPU 508 also turns off the DC relay 90 (33, 29). In other words, the CPU 508 stops discharging of the capacitor unit 89. The charging process thereafter is the same as that according to the first embodiment shown in FIG. 8. The other functions and processes are also the same as these of the first embodiment.

Most of the hardware and functions according to a third embodiment of the present invention are the same as these according to the first embodiment which are explained with reference to FIG. 1 to FIG. 8. In the third embodiment, however, there is a slight modification in the charging process of the capacitor unit 89.

Figure 10:
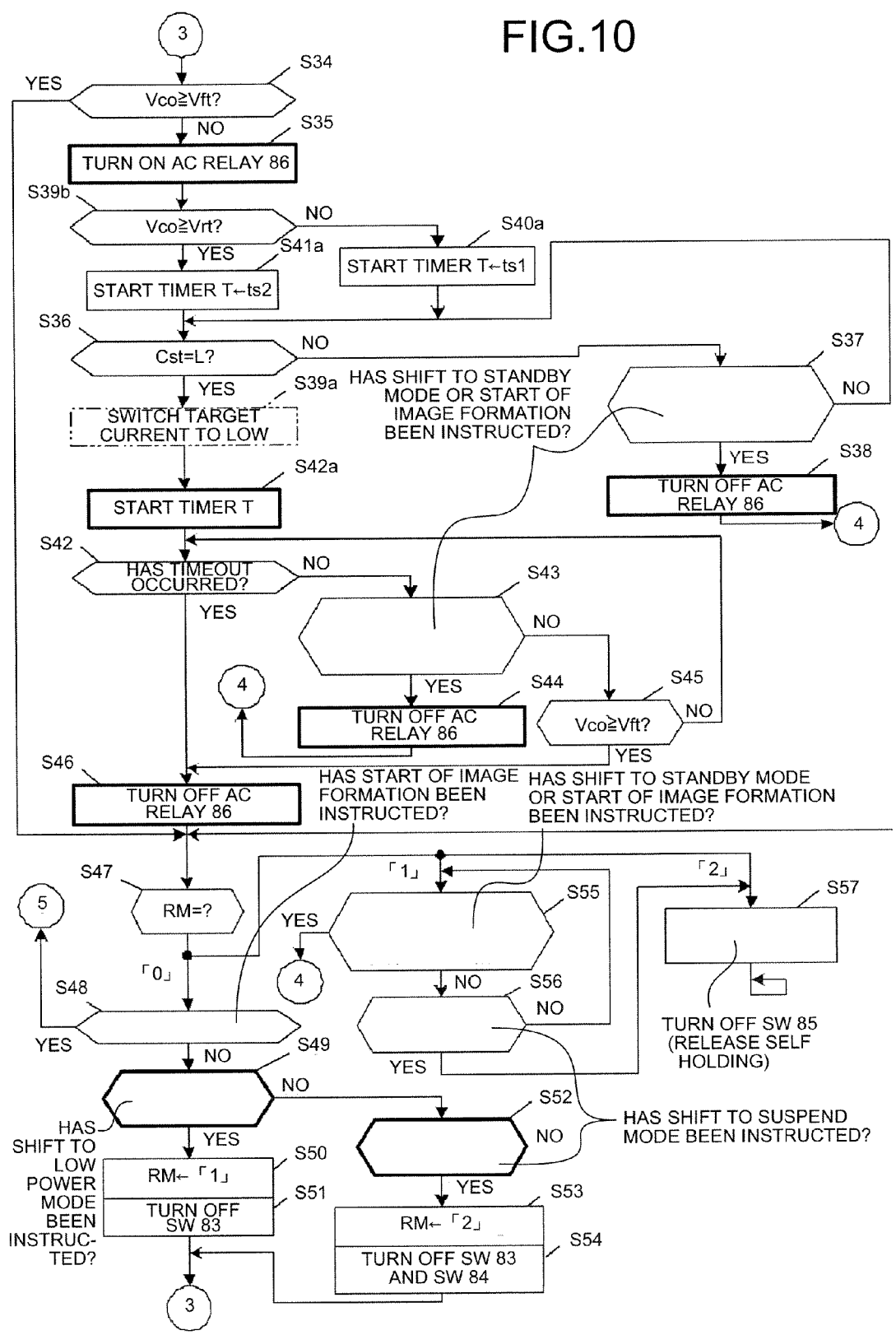
FIG. 10 is a flowchart of a schematic charge control of the capacitor unit by the CPU of the engine controller according to a third embodiment of the present invention.

FIG. 10 indicates how the charging process in the CPU 508 according to the third embodiment is performed. In the third embodiment, when starting charging of the capacitor unit 89 (35), the CPU 508 refers to the output voltage Vco of the capacitor unit 89 at that time (39b). If the output voltage Vco is lower than a predetermined value Vrt specified to a value of about 50% of the rated voltage (45 volts), the long-time value ts1 is set to a time limit of a timer T (40a). If it is equal to or higher than the predetermined value Vrt, the short-time value ts2 is set to the time limit of the timer T (41a). When the signal Cst becomes L indicating that the charging voltage of any one of the capacitors reaches Vs2, the CPU 508 starts the timer T (42a), and waits for timeout of the timer (42). When the timeout occurs, the CPU 508 turns off the AC relay 86 (46). In other words, the CPU 508 stops charging of the capacitor unit 89. The other functions and processes are the same as these of the first embodiment. The discharging (power supply) process according to the third embodiment can also be changed from that shown in FIG. 7 of the first embodiment to that shown in FIG. 9 of the second embodiment.

Figure 11A:
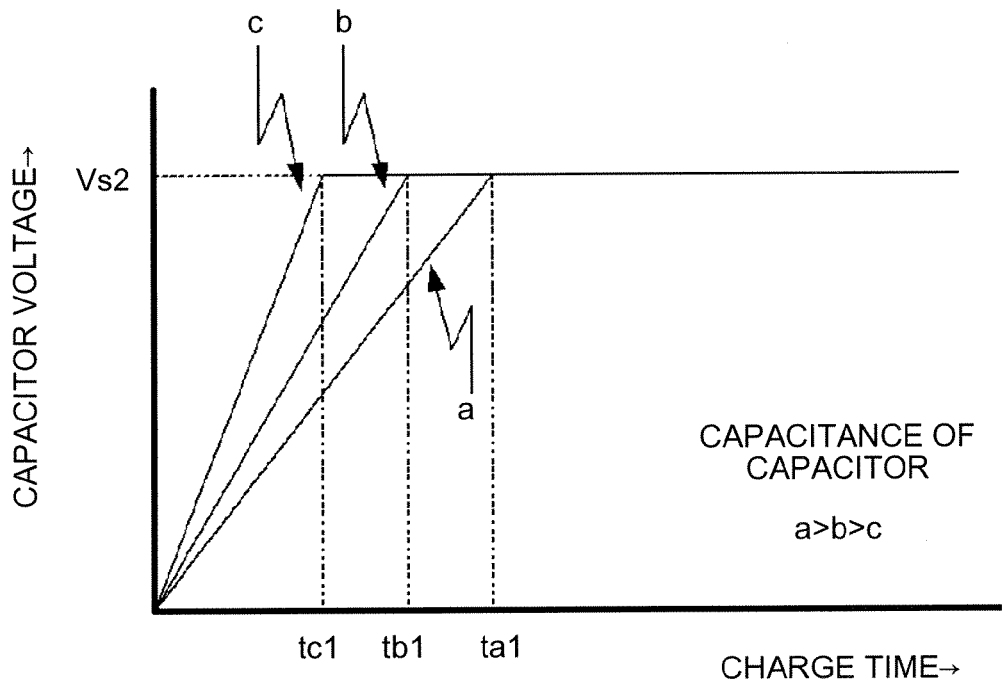
FIG. 11A is a schematic graph of times ta1, tb1, and tc1 during which each voltage of the capacitors in the capacitor unit shown in FIG. 5 reaches a predetermined voltage Vs2.
Figure 11B:
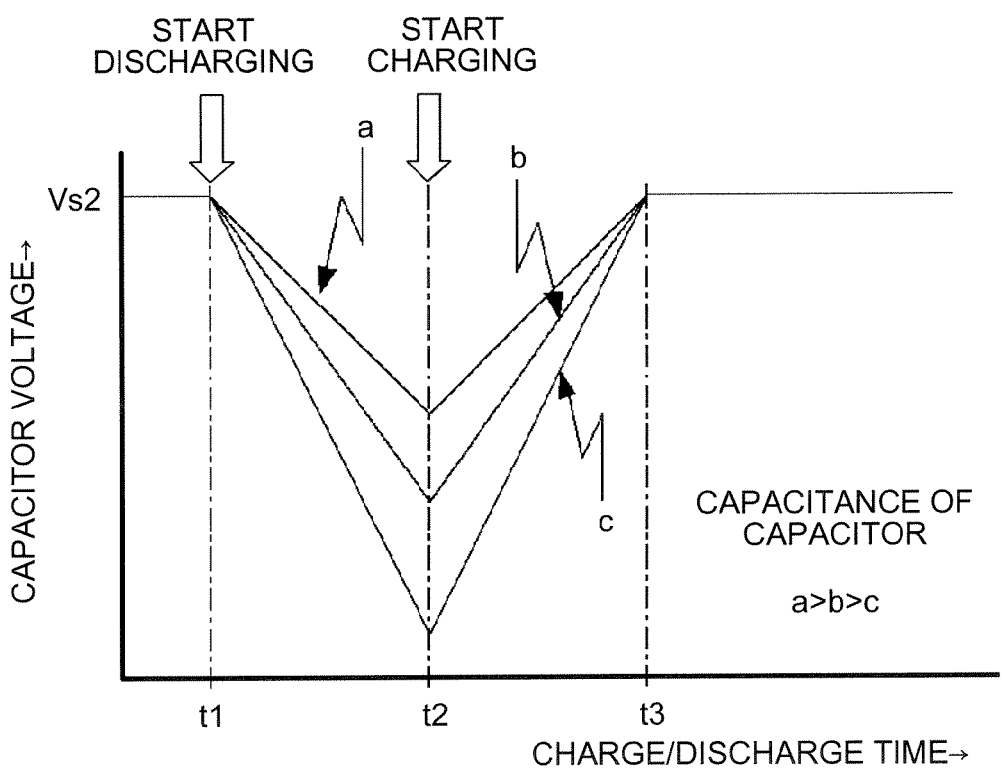
FIG. 11B is a schematic graph of changes in charging voltages of the capacitors in discharging and charging after the voltages of the whole capacitors are set once to the predetermined voltage Vs2.

In the present invention, the capacitor power supply unit includes a capacitor group in which a plurality of capacitors are serially connected to each other, and a plurality of parallel monitors are connected in parallel to the capacitors respectively. In the case of such a capacitor power supply unit, the same amount of large heat generation does not always occur in each charging/discharging cycle. When constant current charging is provided for the capacitors serially connected to each other, because an electrical amount accumulated in each capacitor is equal to each other, the times (ta1, tb1, tc1) required for voltages of the capacitors to reach a predetermined voltage 2 (Vs2) vary because of fluctuation of capacitances among the capacitors (see FIG. 11A). The time for reaching to the predetermined voltage 2 (Vs2) is longer when the capacitance is greater, and becomes ta1>tb1>tc1. However, by once setting voltages of all the capacitors serially connected, to the predetermined voltage 2 (Vs2), the voltage which becomes a reference of charging and discharging is moved to the predetermined voltage 2 (Vs2). Therefore, when subsequent charging and discharging are performed, as shown in FIG. 11B, discharging is started at time t1, the discharging is stopped at t2, charging is started, and voltages of all the capacitors concurrently reach the predetermined voltage 2 (Vs2) at t3. Therefore, the time for bypassing the current to a bypass line is reduced after the voltages of the capacitors are set to the same value, thus reducing heat generation at that time.

According to one aspect of the present invention, when the times (ta1, tb1, tc1) for voltages of the respective capacitors to reach the predetermined voltage 2 (Vs2) vary because the remaining voltage of each capacitor is low and the capacitance fluctuates among the capacitors, all the capacitors reach the predetermined voltage 2 (Vs2) during charging within the long-time time limit (ts1) (see FIG. 12). When the remaining voltage of each capacitor is high and the times (ta1, tb1, tc1) for the respective capacitors to reach the predetermined voltage 2 (Vs2) do not vary much, all the capacitors reach the predetermined voltage 2 (Vs2) during charging within the short-time time limit (ts2) (see FIG. 13). More specifically, only when it is determined that the output voltage of the capacitor group, upon reaching of one of the capacitors to the predetermined voltage 2 (Vs2), is low and that a leakage current largely fluctuates among the capacitors, a remaining charge time (ts1, ts2) is prolonged, which allows reduction of loss consumed in the bypass line. The remaining charge time (ts1, ts2) is automatically selected based on the output voltage (Vco) of the capacitor group, and hence, charging of all the capacitors to the predetermined voltage 2 (Vs2) and reduction of power consumption in the monitor circuits are compatible upon each charging in frequently repeated charging and discharging. Furthermore, the remaining charge time is limited to the long-time time limit (ts1) or the short-time time limit (ts2), which enables to prevent overcurrent to the capacitors.

According to another aspect of the present invention, when the times (ta1, tb1, tc1) for voltages of the respective capacitors to reach the predetermined voltage 2 (Vs2) vary because the remaining voltage of each capacitor is low and the capacitance fluctuates among the capacitors, all the capacitors reach the predetermined voltage 2 (Vs2) during charging within the long-time time limit (ts1) (see FIG. 12). When the remaining voltage of each capacitor is high and the times (ta1, tb1, tc1) for the respective capacitors to reach the predetermined voltage 2 (Vs2) do not vary much, all the capacitors reach the predetermined voltage 2 (Vs2) during charging within the short-time time limit (ts2) (see FIG. 13). More specifically, only when it is determined that the output voltage of the capacitor group upon starting charging thereof is low and that a leakage current largely fluctuates among the capacitor, the remaining charge time (ts1, ts2) after one of the capacitors reaches the predetermined voltage 2 (Vs2) is prolonged, which allows reduction of loss consumed in the bypass line. The remaining charge time (ts1, ts2) is automatically selected based on the output voltage (Vco) of the capacitor group, and hence, charging of all the capacitors to the predetermined voltage 2 (Vs2) and reduction of power consumption in the monitor circuits are compatible upon each charging in frequently repeated charging and discharging. Furthermore, the remaining charge time is limited to the long-time time limit (ts1) or the short-time time limit (ts2), which enables to prevent overcurrent to the capacitors.

Furthermore, when the output voltage (Vco) of the capacitor group reaches a third set value (Vft) even within the remaining charge time (ts1 or ts2), the charging is stopped. Thus, the effects of reduction in the power consumption of the monitor circuits and prevention of overcurrent to the capacitors are further enhanced.

Moreover, a current bypassing the capacitors is reduced, which allows reduction in the power consumption of the bypass circuit. Besides that, a radiating mechanism which is required for bypassing a large amount of current can be eliminated.

According to still another aspect of the present invention, the same effect as explained above is obtained.

Moreover, the heating device further includes a charge controller (508; 30 to 32, 29, 34 to 46 of FIG. 8 to FIG. 10) that charges the capacitor power supply unit when the mode is shifted to the energy-saving mode in which the main energization circuit (540) stops energizing the main heater.

According to still another aspect of the present invention, the same effect as above is obtained.

Furthermore, the image forming apparatus further includes an energy saving controller (502). When the mode is shifted to the operation mode (standby mode) in which the main energization circuit energizes the main heater, the power supply controller (90, 508; 23, 24 of FIG. 7) applies the output voltage of the capacitor power supply unit to the auxiliary heater if the fixing temperature is lower than a first set value (Tft).

Moreover, the image forming apparatus further includes the energy saving controller (502) and the power supply controller (90, 508; 22, 24 of FIG. 9) that applies the output voltage of the capacitor power supply unit to the auxiliary heater when the mode is shifted to the operation mode (standby mode) in which the main energization circuit energizes the main heater.

Furthermore, the image forming apparatus further includes the energy saving controller (502) and a charge controller (508; 30 to 32, 29, 34 to 46 of FIG. 8 to FIG. 10) that charges the capacitor power supply unit when the mode is shifted to the energy-saving mode (low power mode, suspend mode) in which the main energization circuit (540) stops energizing the main heater.

Moreover, the image forming apparatus further includes the charge controller (508; 30 to 32, 29, 34 to 46 of FIG. 8 to FIG. 10) that charges the capacitor power supply unit when the mode is shifted to the energy-saving mode in which the main energization circuit (540) stops energizing the main heater.

Furthermore, the image forming apparatus further includes a rectifying circuit (81) that converts a commercial alternating current to a direct current, the DC/DC converter (82) that converts the direct current to a direct current of a required voltage (+5 VE), and a power supply circuit (514) including a switching unit (85) that outputs/stops the direct current of the required voltage (+5 VE). The energy saving controller (502) operates by the direct current of the required voltage (+5 VE) output by the DC/DC converter (82), decides whether it is necessary to switch between the operation mode and the energy-saving mode, and sets the switching unit to an output of the direct current when it is needed to switch from the energy-saving mode to the operation mode.

Moreover, the power supply controller (90, 508) operates by a direct current voltage (+5 volts) output by the switching unit.

Furthermore, when charging of the capacitor power supply unit is finished, the charge controller (508) switches so that the switching unit (85) stops the output (57 of FIG. 8 and FIG. 10).

According to still another aspect of the present invention, the capacitor unit includes the auxiliary power supply that includes th electric double layer capacitors serially connected to each other and that is chargeable; the charger that charges the auxiliary power supply; and the parallel monitor circuits that are connected in parallel to the capacitors respectively, monitor a charging voltage of each capacitor, bypass a charging current when the voltage reaches a predetermined voltage 2, and each of which includes the photocoupler for transmitting a predetermined-voltage reaching signal to the charger. When a voltage of both ends of the capacitors serially connected to each other upon starting to charge the capacitors is lower than a predetermined voltage 1, to set charging voltages of all the capacitors to the same value, charging is performed for a predetermined time 1 after any one of the capacitors reaches the predetermined voltage 2, and then the charging is terminated. When a voltage of both ends of the capacitors upon starting to charge the capacitors is higher than the predetermined voltage 1, charging is performed for a predetermined time 2 after any one of the capacitors reaches the predetermined voltage 2, and then the charging is terminated.

Furthermore, in the capacitor unit, after a charging voltage of any one of the capacitors reaches the predetermined voltage 2 and the charger receives the predetermined-voltage reaching signal, the charging current is reduced and the charging is further performed. When the voltage across both ends of the auxiliary power supply reaches a predetermined voltage 3, the charging is terminated.

Moreover, in the capacitor unit, after a charging voltage of any one of the capacitors reaches the predetermined voltage 2 and the charger receives the predetermined-voltage reaching signal, the charging current is reduced and the charging is further performed. When the voltage across both ends of the auxiliary power supply reaches the predetermined voltage 3 before the set charge time, the charging is terminated.

According to still another aspect of the present invention, in the capacitor unit, the charge time, from reaching of any one of capacitors to the predetermined voltage 2 to termination of the charging is switched between predetermined time 1 and predetermined time 2 based on the voltages of the both ends upon starting to charge.

According to still another aspect of the present invention, in the capacitor unit, after a charging voltage of any one of the capacitors reaches the predetermined voltage 2 and the charger receives the predetermined-voltage reaching signal, a charging current is reduced and the charging is performed for the predetermined time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A capacitor power supply unit comprising:
    a capacitor group in which a plurality of capacitors are serially connected to each other;
    a voltage detector that detects an output voltage of the capacitor group;
    a charger that charges the capacitor group;
    a plurality of monitor units that are connected in parallel to the capacitors in the capacitor group, respectively, that bypass a charging current when a voltage of each of the capacitors reaches a predetermined voltage, and generate a reaching signal indicating reaching to the predetermined voltage; and
    a charge controller that sets a long-time time limit if the output voltage is lower than a first value, when the reaching signal is generated, and sets a short-time time limit if the output voltage is higher than the first value, starts counting time, and stops charging performed by the charger after the time limit elapses.

2. The capacitor power supply unit according to claim 1, wherein when the output voltage reaches a third value after the counting is started, the charge controller stops the charging performed by the charger.

3. The capacitor power supply unit according to claim 1, wherein the charger includes a constant current controller that controls a charging current so as to be a target current, and decreases the charging current when the reaching signal is generated.

4. A heating device comprising:
    a main heater;
    a main energization circuit that energizes the main heater;
    an auxiliary heater; and
    a capacitor power supply unit according to claim 1 to energize the auxiliary heater.

5. The heating device according to claim 4, further comprising a power supply controller that applies an output voltage of the capacitor power supply unit to the auxiliary heater when a heating temperature is lower than the first value.

6. The heating device according to claim 4, further comprising:
    an energy saving controller; and
    a charge controller that charges the capacitor power supply unit when a mode is shifted to an energy-saving mode in which energization to the main heater performed by the main energization circuit is stopped.

7. The heating device according to claim 4, further comprising:
    an energy saving controller; and
    a power supply controller that applies an output voltage of the capacitor power supply unit to the auxiliary heater when a mode is shifted to an operation mode in which the main energization circuit energizes the main heater.

8. An image forming apparatus comprising:
    an imaging unit that forms an electrostatic latent image on a photosensitive element, develops the electrostatic latent image to form a toner image, and transfers the toner image directly to a paper or indirectly thereto through an intermediate transfer element;
    a fixing device that includes
        a main heater; and
        an auxiliary heater, and that fixes the toner image on the paper;
    a main energization circuit that energizes the main heater; and
    a capacitor power supply unit according to claim 1 to energize the auxiliary heater.

9. The image forming apparatus according to claim 8, further comprising a power supply controller that applies an output voltage of the capacitor power supply unit to the auxiliary heater when a fixing temperature is lower than a first set value.

10. A copying device comprising:
    an image reader that reads an image projected by an optical system and generates image data indicating the image; and
    an image forming apparatus according to claim 8, wherein the image forming apparatus includes an image data processor that converts the image data generated to image data which is suitable for image formation by the image forming apparatus, and uses the image data for the image formation.

11. A capacitor power supply unit comprising:
a capacitor group in which a plurality of capacitors are serially connected to each other;
a voltage detector that detects an output voltage of the capacitor group;
a charger that charges the capacitor group;
a plurality of monitor units that are connected in parallel to the capacitors in the capacitor group, respectively, that bypass a charging current when a voltage of each of the capacitors reaches a predetermined voltage, and generate a reaching signal indicating reaching to the predetermined voltage; and
a charge controller that sets a long-time time limit if the output voltage, when the charger starts charging, is lower than a predetermined value, and sets a short-time time limit if the output voltage is higher than the predetermined value, starts counting time when the reaching signal is generated, and stops the charging performed by the charger after the time limit elapses.

12. The capacitor power supply unit according to claim 11, wherein when the output voltage reaches a value after the counting is started, the charge controller stops the charging performed by the charger.

13. The capacitor power supply unit according to claim 11, wherein the charger includes a constant current controller that controls a charging current so as to be a target current, and decreases the charging current when the reaching signal is generated.

14. A heating device comprising:
a main heater;
a main energization circuit that energizes the main heater;
an auxiliary heater; and
a capacitor power supply unit according to claim 11 to energize the auxiliary heater.

15. The heating device according to claim 14, further comprising a power supply controller that applies an output voltage of the capacitor power supply unit to the auxiliary heater when a heating temperature is lower than a predetermined heating value.

16. The heating device according to claim 14, further comprising:
an energy saving controller; and
a charge controller that charges the capacitor power supply unit when a mode is shifted to an energy-saving mode in which energization to the main heater performed by the main energization circuit is stopped.

17. The heating device according to claim 14, further comprising:
an energy saving controller; and
a power supply controller that applies an output voltage of the capacitor power supply unit to the auxiliary heater when a mode is shifted to an operation mode in which the main energization circuit energizes the main heater.

18. An image forming apparatus comprising:
an imaging unit that forms an electrostatic latent image on a photosensitive element, develops the electrostatic latent image to form a toner image, and transfers the toner image directly to a paper or indirectly thereto through an intermediate transfer element;
a fixing device that includes
a main heater; and
an auxiliary heater, and that fixes the toner image on the paper;
a main energization circuit that energizes the main heater; and
a capacitor power supply unit according to claim 11 to energize the auxiliary heater.

19. The image forming apparatus according to claim 18, further comprising a power supply controller that applies an output voltage of the capacitor power supply unit to the auxiliary heater when a fixing temperature is lower than a first set value.

20. A copying device comprising:
an image reader that reads an image projected by an optical system and generates image data indicating the image; and
an image forming apparatus according to claim 18, wherein the image forming apparatus includes an image data processor that converts the image data generated to image data which is suitable for image formation by the image forming apparatus, and uses the image data for the image formation.

* * * * *